(12) United States Patent
Joseph et al.

(10) Patent No.: US 11,473,803 B2
(45) Date of Patent: Oct. 18, 2022

(54) INBUILT PROGRAMMING TOOL FOR USE BY NON-PROGRAMMERS TO ADD INTELLIGENCE TO A BUILDING AUTOMATION SYSTEM

(71) Applicant: Honeywell International Inc., Morris Plains, NJ (US)

(72) Inventors: Franklin Joseph, Bangalore (IN); Nilesh Akode, Bangalore (IN); Sanjay Nair, Bangalore (IN); Venugopala Kilingar Nadumane, Bangalore (IN); Manish K. Sharma, Bangalore (IN); Sheeladitya Karmakar, Bangalore (IN); Rajendra S. Kumar, Mysore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/628,637

(22) PCT Filed: Jul. 5, 2017

(86) PCT No.: PCT/US2017/040771
§ 371 (c)(1),
(2) Date: Jan. 3, 2020

(87) PCT Pub. No.: WO2019/009892
PCT Pub. Date: Jan. 10, 2019

(65) Prior Publication Data
US 2021/0140668 A1    May 13, 2021

(51) Int. Cl.
F24F 11/30 (2018.01)
F24F 11/58 (2018.01)
F24F 11/54 (2018.01)

(52) U.S. Cl.
CPC .............. *F24F 11/58* (2018.01); *F24F 11/30* (2018.01); *F24F 11/54* (2018.01)

(58) Field of Classification Search
CPC . F24F 11/58; F24F 11/30; F24F 11/54; G05B 2219/23258; G05B 2219/2642
See application file for complete search history.

(56) References Cited

U.S. PATENT DOCUMENTS

| 6,993,417 B2 | 1/2006 | Osann, Jr. |
| 7,309,965 B2 | 12/2007 | Dowling et al. |
| 7,870,090 B2 | 1/2011 | McCoy et al. |

(Continued)

OTHER PUBLICATIONS

"A building management system that is writing history," Siemens, 8 pages, 2014.

(Continued)

*Primary Examiner* — Mohammad Ali
*Assistant Examiner* — Vincent W Chang
(74) *Attorney, Agent, or Firm* — Seager, Tute & Wickhem, LLP

(57) ABSTRACT

A plurality of triggers may be presented and a selection of a predefined trigger may be accepted. Corresponding actions for the selected trigger may then be presented and an assignment of building control components may be accepted for the corresponding actions. During subsequent operation of a building automation system, the selected trigger may be detected and the corresponding actions may then be performed on the assigned building control components.

19 Claims, 13 Drawing Sheets

(56) References Cited

U.S. PATENT DOCUMENTS

| | | | |
|---|---|---|---|
| 7,904,209 B2 | 3/2011 | Podgorny et al. | |
| 8,050,801 B2 | 11/2011 | Richards et al. | |
| 8,862,532 B2 | 10/2014 | Beaulieu et al. | |
| 10,215,434 B2* | 2/2019 | Harris | G05B 15/02 |
| 2002/0016639 A1* | 2/2002 | Smith | G05B 15/02 |
| | | | 700/9 |
| 2005/0090915 A1 | 4/2005 | Geiwitz | |
| 2007/0055759 A1 | 3/2007 | McCoy et al. | |
| 2010/0241245 A1* | 9/2010 | Wiemeyer | H04L 43/0817 |
| | | | 700/19 |
| 2010/0286937 A1 | 11/2010 | Hedley et al. | |
| 2011/0040666 A1 | 2/2011 | Crabtree et al. | |
| 2011/0047418 A1 | 2/2011 | Drees et al. | |
| 2011/0301764 A1* | 12/2011 | Lapierre | G05B 19/0426 |
| | | | 700/275 |
| 2014/0115131 A1* | 4/2014 | Zhu | H04L 41/0893 |
| | | | 709/221 |
| 2014/0129032 A1* | 5/2014 | Harris | G05B 15/02 |
| | | | 700/275 |
| 2014/0156097 A1 | 6/2014 | Nesler et al. | |
| 2017/0005818 A1* | 1/2017 | Gould | G06F 3/0482 |
| 2017/0223807 A1* | 8/2017 | Recker | H05B 47/19 |
| 2017/0344923 A1* | 11/2017 | Pike | H04L 12/2803 |

OTHER PUBLICATIONS

Clark, "Rule-Based Integrated Building Management System," Department of Electrical and Electronic Engineering, 239 pages, Jul. 1993.

* cited by examiner

| Points 222 | | HVAC<br>AHU-DDC-115<br>Floor-1 | | |
|---|---|---|---|---|
| | | | 280 Graphic | 278 List |
| All Points | 258 > | Point Label | State | Value |
| Filter | 260 | RA Temp | Active | 24°C |
| Create Group | 230 + | RA Humidity | Active | Value |
| Fire | 232 + | RA Flow | Active | Value |
| Security | 234 + | RA Fan Speed | Active | Value |
| HVAC | 236 + | OA Dampr Pos | Open | Value |
| Chiller | 270 | | | |
| DDC-101 | 272 | | | |
| AHU | 274 | | | |
| DDC-115 | 276 | | | |
| Lighting | 238 + | | | |
| Unknown Devices | 240 + | | | |

FIG. 2C

INBUILT PROGRAMMING TOOL FOR USE BY NON-PROGRAMMERS TO ADD INTELLIGENCE TO A BUILDING AUTOMATION SYSTEM

This application is a National Stage of International Application No. PCT/US2017/040771, filed Jul. 5, 2017, which is incorporated herein by reference.

TECHNICAL FIELD

The disclosure relates generally to building automation systems, and more particularly tools for adding intelligence to such building automation systems.

BACKGROUND

Building automation systems are used to control the operation of a building. A building automation system may include one or more sub-systems such as a Heating, Ventilation and/or Air Conditioning (HVAC) system, a security system, a lighting system, a fire system and/or other sub-system. Such sub-systems are often not integrated into a cohesive systems. In many cases, the sub-systems are purchased, installed and maintained by different vendors. This can make management of the building less efficient and expensive for the facility managers, operators and building owners. What would be desirable is a system that is capable of integrating the subsystems into a more cohesive building automation system, and in some cases, allow non-programmers to add intelligence to the building automation system.

SUMMARY

The disclosure describes systems, methods, and executable programs that help an installer or other user to have more control over the operation of a building automation system. In some cases, the disclosure describes a system that is capable of integrating disparate subsystems into a more cohesive building automation system, and may allow non-programmers to add intelligence to the resulting building automation system.

To help integrate disparate subsystems into a more cohesive building automation system, the system may auto-discover at least two building control components from two or more different building system categories (e.g. HVAC sub-system and Fire sub-system) by communicating with the various building control components via an I/O interface using two or more different protocols. In some cases, one building system category (e.g. HVAC sub-system) may use a first protocols with a first auto-discovery procedure and another building system category (e.g. Fire sub-system) may use a second protocol with a second auto-discovery procedure. The discovered building control components may be automatically categorized by the system and grouped on a user interface screen for easy user identification.

To help non-programmers add intelligence to the building automation system, a user may be allowed to define a number of customized rules for execution by the building automation system. To define a rule, the user may be presented with a plurality of predefined triggers, and the user may select one of the predefined triggers. A plurality of corresponding predefined actions for the selected predefined trigger may then be presented, and the user may select one or more of the predefined actions. In some cases, the user may also assign certain ones of the building control components of the building automation system to the rule. During subsequent operation of the building automation system, the predefined trigger may be detected, and in response, the selected one or more predefined actions may be performed on the assigned building control components. In some cases, a rule may perform predefined actions on building control components from two or more building system categories (e.g. HVAC sub-system, Fire sub-system, Lighting sub-system, Security sub-system, etc.).

In an example of the disclosure, a building automation system for a building may include an I/O interface for communicating with a plurality of building control components of the building, a user interface, and a controller operatively coupled to the I/O interface and the user interface. The controller may be configured to present via the user interface a plurality of predefined triggers, accept a selection of one of the plurality of predefined triggers via the user interface, and may present via the user interface a plurality of corresponding predefined actions. In some cases, for each of the plurality of corresponding predefined actions, the building automation system may accept an assignment of one or more of the plurality of building control components. The plurality of building control components may include building control components from two or more different building system categories such as a Heating, Ventilation and/or Air Conditioning (HVAC) system, a security system, a fire system, an access control system, and a lighting system. During subsequent operation of the building automation system, the controller may be configured to detect an occurrence of the selected predefined triggers, and in response, may perform each of the plurality of corresponding predefined actions on each of the one or more assigned building control components.

Alternatively or additionally to any of the embodiments above, for at least one of the plurality of predefined actions, the controller may be configured to accept an assignment of one or more of the plurality of building control components from only one of the two or more different building system categories. Alternatively, for at least one of the plurality of predefined actions, the controller may be configured to accept an assignment of one or more of the plurality of building control components from two or more of the two or more different building system categories.

Alternatively or additionally to any of the embodiments above, at least some of the plurality of building control components of the building may be assigned to one of a plurality of zones within the building, and wherein the controller may be configured to present via the user interface a plurality of zones, accept a selection of one of the plurality of zones via the user interface; and for the selected one of the predefined triggers, present via the user interface a plurality of corresponding predefined actions, wherein for each of the plurality of corresponding predefined actions, accept an assignment of one or more of the building control components that correspond to the selected zone.

Alternatively or additionally to any of the embodiments above, the controller may be configured to accept via the user interface a definition of one or more predefined triggers (user defined triggers).

Alternatively or additionally to any of the embodiments above, for the selected one of the predefined triggers, a plurality of corresponding predefined actions may be presented sometimes including one or more user defined actions, wherein for each of the plurality of corresponding predefined actions, an assignment of one or more of the plurality of building control components may be accepted.

Alternatively or additionally to any of the embodiments above, the plurality of predefined triggers may include one or more of a detection of a fire, a detection of an intrusion, and a detection of an interruption in power to the building.

Alternatively or additionally to any of the embodiments above, the plurality of building control components may include one or more Air Handling Units (AHU) of a Heating, Ventilation and/or Air Conditioning (HVAC) system, and the plurality of corresponding predefined actions may include switching off one or more of the AHUs.

Alternatively or additionally to any of the embodiments above, the plurality of building control components may include one or more emergency lights of a lighting system, and the plurality of corresponding predefined actions may include switching on one or more of the emergency lights.

Alternatively or additionally to any of the embodiments above, the plurality of building control components may include one or more door locks of an access control system, and the plurality of corresponding predefined actions may include unlocking or locking one or more of the door locks.

Alternatively or additionally to any of the embodiments above, at least two of the plurality of building control components may be from two or more different building system categories including a Heating, Ventilation and/or Air Conditioning (HVAC) system, a security system, a fire system, an access control system, and a lighting system, and the controller is configured to auto-discover the at least two building control components from two or more different building system categories by communicating via the I/O interface using two or more different protocols.

Alternatively or additionally to any of the embodiments above, the two or more different protocols may be two or more different building automation protocols.

Alternatively or additionally to any of the embodiments above, the two or more building automaton protocols may include two or more of 1-Wire, BACnet, C-Bus, CC-Link Industrial Networks, DALI, DSI, Dynet, EnOcean, KNX, LonTalk, Modbus, oBIX, VSCP, xAP, X10, Z-Wave, Zig-Bee, and INSTEON, DC-09, DALI, and Ethernet.

Alternatively or additionally to any of the embodiments above, the controller may be configured to automatically categorize at least one of the building control components that are auto-discovered based, at least in part, on which of the two or more different protocols was used to auto-discover the at least one building control component.

Alternatively or additionally to any of the embodiments above, the at least one of the building control components that are automatically categorized may be sorted on the user interface by building system category to aid the user in finding and assigning the at least one of the building control components to a selected predefined action.

Alternatively or additionally to any of the embodiments above, the controller may be configured to display building control components from two or more different building system categories on a floorplan of the building, and wherein the controller may be further configured to allow selection of a building system category and may only display an operational status of the building control components of the selected building system category.

Alternatively or additionally to any of the embodiments above, the I/O interface and controller may be part of a server.

Another example of the disclosure include a non-transitory computer-readable storage medium with an executable program stored thereon. The executable program may be configured to instruct a building automation system to present via a user interface a plurality of predefined triggers for selection by a user. A selection of one of the plurality of predefined triggers may be accepted via the user interface. For the selected one of the predefined triggers, the executable program may present via the user interface a plurality of corresponding predefined actions, wherein for each of the plurality of corresponding predefined actions, an assignment of one or more of the plurality of building control components may be accepted. During subsequent operation of the building automation system, an occurrence of the selected one of the predefined triggers may be detected, and in response, the executable program may perform each of the plurality of corresponding predefined actions on each of the corresponding assigned building control components.

Alternatively or additionally to any of the embodiments above, the plurality of building control components may include building control components from two or more different building system categories, including a Heating, Ventilation and/or Air Conditioning (HVAC) system, a security system, a fire system, an access control system, and a lighting system. In some cases, for at least one of the plurality of predefined actions, an assignment may be accepted of one or more of the plurality of building control components from only one of the two or more different building system categories. In some cases, for at least one of the plurality of predefined actions, an assignment may be accepted of one or more of the plurality of building control components from two or more different building system categories.

In another example of the disclosure, a method for defining trigger actions in a building automation system includes presenting via a user interface a plurality of predefined triggers, and accepting a selection of one of the plurality of predefined triggers via the user interface. For the selected one of the predefined triggers, a plurality of corresponding predefined actions may be presented to the user via the user interface, wherein for each of the plurality of corresponding predefined actions, an assignment of one or more of a plurality of building control components may be accepted via the user interface. In some cases, for at least one of the plurality of predefined actions, an assignment may be accepted of one or more of the plurality of building control components from only one of two or more different building system categories. In some cases, for at least one of the plurality of predefined actions, an assignment may be accepted of one or more of the plurality of building control components from two or more different building system categories. In any event, during subsequent operation of the building automation system, an occurrence of the selected one of the predefined triggers may be detected, and in response, each of the plurality of corresponding predefined actions may be performed on each of the corresponding one or more assigned building control components.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which:

FIG. 2C is an illustrative discovered points page screen in a list mode;

Figure 1A:
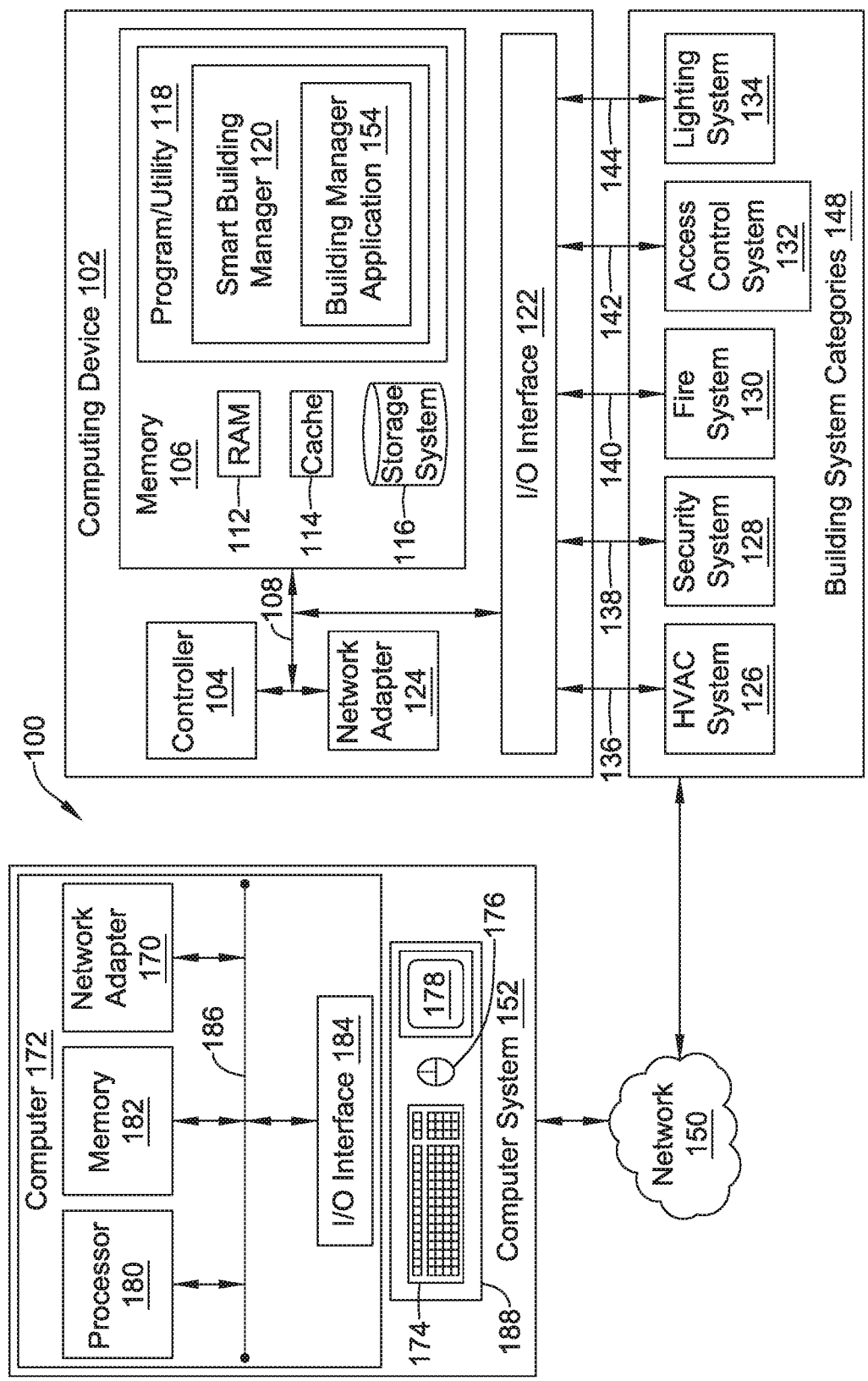
FIG. 1A is a schematic block diagram of an illustrative building automation system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure.

Certain embodiments of the present disclosure may be found in a system, a method, and/or a non-transitory computer-readable storage medium with an executable program stored thereon for implementing an inbuilt programming tool for use by non-programmers to add intelligence to a building automation system. In various embodiments, a controller may be configured to direct the operation of building control devices of a building automation system located in or around a building. In this regard, a user may have insight into the overall performance of the building automation system and descriptions of the operation of individual building control devices for specific events and circumstances. This disclosure describes systems, methods, and executable programs that allow an installer or other user to more easily discover, organize, and add intelligence to a building automation system.

According to various embodiments, the system may detect the presence of a variety of building control devices throughout a building. In some cases, one or more of the building control devices may be auto discovered and added to the system. In some cases, the system may automatically categorize the auto discovered building control devices. In some cases, one or more of the auto discovered building control devices may be automatically categorized based on building system categories (e.g. HVAC sub-system, Fire sub-system, Lighting sub-system, Security sub-system, etc.), or more generally according to the task they perform and/or the character of their operation. In some cases, one or more of the auto discovered building control devices may be automatically categorized based on which of two or more protocols were used to auto discover the building control device. In some cases, one or more of the building control devices may be manually categorized.

In some cases, one or more of the building control devices may be manually identified and added to the system. For example, the user may enter a device ID and/or device address to identify a building control device in the building automation system. Once identified, and in some cases, one or more of the building control devices may be manually categorized.

A user may be presented with one or more predefined triggers that can occur in and/or around the building. In some cases, the predefined triggers may be predefined by a manufacturer of the building automation system or the like, an installer, or other person or entity. In some cases, at least one of the predefined triggers may be user defined, such as through a trigger definition routine. The user may then select the predefined triggers for which the user want to trigger a control event for one or more of the building control devices of the building automation system.

Because the building control devices have been identified and the tasks they perform are known, the user may be presented with one or more predefined actions that can be performed for each of the selected predefined triggers. The user may also select which of the building control devises are to perform each action in response to a detected trigger event. In this way, the user may be presented with an easy and intuitive way to define IF-This-Then-That (IFTTT) rules that can operate across different building system categories.

FIG. 1A is a schematic block diagram of an illustrative building automation system 100. In certain embodiments, the building automation system 100 may include a local computing device 102, building control components having two or more different building system categories 148 operatively coupled to the local computing device, and a remote computer system 152. As shown, the building system categories 148 may include, but are not limited to, a Heating, Ventilation, and/or Air Conditioning (HVAC) system 126, a security system 128, a fire system 130, an access control system 132, and a lighting system 134.

In some embodiments, the HVAC system 126 may include one or more HVAC control devices (e.g. Air Handing Units (AHU), Variable-Air-Volume (VAV) units, dampers, valves, fans, heating units, cooling units, sensors, thermostats, humidifiers, dehumidifiers etc.), which allow for the monitoring and/or control of temperature and/or other environmental conditions in the building. The security system 128 may include, sensors, alarm devices, audio/visual devices, lights, contact sensors for monitoring the state of doors and windows, security card pass systems, electronic locks, etc. The fire system 130 may include smoke/heat sensors, a sprinkler system, warning lights, etc. The access control system 132 may include doors, door locks, windows, window locks, turnstiles, parking gates, elevators, or other physical barrier, where granting access can be electronically controlled. The lighting system 134 may include emergency lights, outlets, lighting, drapes, and general load switching, some of which are subject to "dimming" control which varies the amount of power delivered to the various building control devices. These are just a few examples of building system categories 148. In some cases, the building system categories 148 may also include low voltage devices (not shown) that may include, but are not limited to, garage door openers, lawn sprinklers, exterior lights, and pool/spa heaters (controlled via a relay or the like).

As shown in FIG. 1A, the local computing device 102 can function as a server, a client, a local controller, or any other suitable device. In the example shown, local computing device 102 can perform various communication and data transfer functions as described herein and can execute one or more application functions. Computing device 102 can be any of a wide variety of computing devices, such as a server computer, a desktop computer, a handheld computer, a tablet computer, mobile telephone or other mobile device, and the like. The components of computing device 102 may include, but are not limited to, a controller 104, a system memory 106, and a bus 108 that couples various system components including system memory 106 to the controller 104. The controller 104 may include one or more controllers or processors that execute instructions stored in the system memory 106.

When provided, the bus 108 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Local computing device 102 may include a variety of computer system readable media. Such media may be any available media that is accessible by the local computing device 102, and it may include volatile memory, non-volatile memory, removable and non-removable media.

The system memory 106 of the local computing device 102 can include computer system readable media in the form of volatile memory, such as random access memory (RAM) 112 and/or cache memory 114. Computing device 102 may further include other removable/non-removable, volatile/non-volatile computer system storage media. By way of example only, storage system 116 can be provided for reading from and writing to a non-removable, non-volatile magnetic media (not shown and typically called a "hard drive"). Although not shown, a magnetic disk drive for reading from and writing to a removable, non-volatile magnetic disk a "floppy disk"), and an optical disk drive for reading from or writing to a removable, non-volatile optical disk such as a CD-ROM, DVD-ROM or other optical media can be provided. In such instances, each can be connected to the bus 108 by one or more data media interfaces. As will be further depicted and described below, the system memory 106 may include at least one program product having a set of program modules that are configured to carry out the functions of providing instructions to the building automation system 100.

In one example, program/utility 118 may be stored in the system memory 106 and may include a set of application program modules (e.g. software), such as a smart building manager 120. In some cases, the program/utility 118 may include additional program modules as well as an operating system, one or more other application program modules, and program data. According to various embodiments, the application program modules (e.g., the smart building manager 120) may include a building manager application 154, for example. In certain embodiments, the smart building manager 120, including the building manager application 154, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The smart building manager 120 may execute on the local computing device 102. In some cases, the smart building manager 120 may execute on the remote computer system 152. In some cases, part of the smart building manager 120 is executed on the local computing device 102 and part of the smart building manager 120 is executed on the remote computer system 152. In the latter scenario, the remote computer system 152 may be connected to the local computing device 102 through any type of network (e.g., network 150), including a local area network (LAN) or a wide area network (WAN), or the connection may be made to an external computer (for example, through the Internet using an Internet Service Provider).

In various embodiments, the local computing device 102 may communicate with one or more devices such as the building control components of the various building system categories 148. Such communication can occur via Input/Output (I/O) interface(s) 122. In some cases, building control components of two or more of the building system categories 148 may be managed by the local computing device 102. In certain embodiments, the local computing device 102 may use the controller 104 to send control instructions to the building control components of two or more building system categories 148. For instance, the controller 104 of the local computing device 102 may be operatively coupled to I/O interface(s) 122 via the bus 108, and may use the I/O interface 122 to communicate with building control components of two or more building system categories 148.

In some cases, the I/O interface 122 may be connected to the building control components through a wired or wireless network, and in some cases may communicate with building control components of two or more building system categories 148 using two or more different communication protocols. For example, in certain embodiments, the I/O interface 122 may communicate with the HVAC system 126 through serial and/or parallel communication using building automation protocols over a BACnet 136. In some cases, the I/O interface 122 may communicate with the security system 128 through serial and/or parallel communication using building automation protocols over a DC-09 network 138. In some cases, the I/O interface 122 may communicate with the fire system 130 through serial and/or parallel communication using building automation protocols over a Modbus network 140. In some cases, the I/O interface 122 may communicate with the access control system 132 through serial and/or parallel communication using building automation protocols over an EnOcean network 142. In some cases, the I/O interface 122 may communicate with the lighting system 134 through serial and/or parallel communication using building automation protocols over a DALI network 144. These are just examples of building control network protocols that may be used to facilitate communication between the local computing device 102 and the building control components of various building system categories 148. Other building control network protocols that are contemplated include, but are not limited to, 1-Wire, C-Bus, CC-Link Industrial Networks, DSI, Dynet, KNX, LonTalk, oBIX, VSCP, xAP, X10, Z-Wave, ZigBee, INSTEON, TCIP, and/or Ethernet.

To help integrate disparate subsystems into a more cohesive building automation system, the controller 104 may be configured to auto-discover building control components of the various building system categories 148. Because each building control system 126, 128, 130, 132 and 134 of the building system categories 148 may use a different communication protocol, it is contemplated that the controller 104 may be configured to communicate over I/O interface 122 using two or more different communication protocols. For example, the controller 104 may send an auto-discovery request on the I/O Interface 122 using the BACnet protocol 136, which in the example shown may cause building control components of the HVAC system 126 to return their device ID, device address, control parameters and/or other information back to controller 104. The controller 104 may then send an auto-discovery request on the I/O interface 122 using the DC-09 protocol 138, which in the example shown may cause building control components of the Security system 128 to return their device ID, device address, control parameters and/or other information back to controller 104. This may be repeated in an attempt to auto-discover building control components of the Fire system 130, Access Control system 132 and Lighting system 134. More generally, the controller 104 may communicate with building control components of two or more building system categories 148 via an I/O interface. In some cases, one building system category (e.g. HVAC sub-system 126) may use a first protocols with a first auto-discovery procedure and another building system category (e.g. Fire sub-system 130) may use a second protocol with a second auto-discovery procedure.

The discovered building control components may be automatically categorized by the controller 104 and grouped on a user interface screen for easy user identification. In some cases, the discovered building control components may be categorized based on the communication protocol that was used to auto-discover the building control component. In some cases, the building control components may be grouped under a particular building system category (e.g, the HVAC system 126) of the building system categories 148. Alternatively, or in addition, the building control components may be categorized according to the task they perform, in some cases, the building automation system may be connected to one or more building control components that are not auto-discoverable. For these devices, an installer or the like may manually enter the device information into the system 100 such that the building control component can be identified and controlled by the controller 104. The installer may also categorize the building control device and add the building control device to an appropriate group on a user interface screen for easy user identification.

According to certain embodiments, the computing device 102 and the computer system 152, when both are provided, may utilize a network 150 to communicate. In some examples, the network 150 may be a local area network (LAN), a general wide area network (WAN), and/or a public network (e.g., the Internet) Furthermore, in some cases, the network 150 may include copper transmission cables, optical transmission fibers, wireless transmission, routers, firewalls, switches, gateway computers and/or edge servers. In certain instances, a network adapter 124 is included in the computing device 102 and a network adapter 170 is included in the computer system 152 to support communication. In some cases, the building system categories block 148 may include the computer system 152. In other cases, the computer system 152 is only temporarily used by an installer or the like to help setup and/or maintain the building automation system.

According to various embodiments, the computer system 152 is of a type that is suitable for accessing and/or utilizing the smart building manager 120, consistent with embodiments of the present disclosure. The computer system 152 provides only an illustration of one implementation and does not imply any limitations with regard to the environments in which different embodiments may be implemented. Many modifications to the computer system 152 may be made based on design and implementation requirements. Examples of computer systems, environments, and/or configurations that may be represented by the computer system 152 include, but are not limited to, desktop computers, laptop computers, server computers, thin clients, thick clients, multiprocessor systems, microprocessor-based systems, and distributed cloud computing environments. In some cases, computer system 152 merely provides a user interface for an installer or the like to interact with the smart building manager 120 of the computing device 102. In some cases, the user interface function of the computer system 152 may be implemented by computing device 102, and the computer system 152 may not be needed.

In certain embodiments, components of the computer system 152 may include a computer 172 and a user interface 188. Components of the computer 172 may include a processor 180, a memory 182, an I/O interface 184, and the network adapter 170. Each of the components of the computer 172 may be connected to an internal bus 186 that includes data, address, and control buses, to allow the components of the computer 172 to communicate with each other via the bus 186.

In certain embodiments, the processor 180 may be a central processing unit (CPU) that executes an operating system and computer software executing under the operating system. In some cases, the memory 182 may be configured and operate similar to the system memory 106. For instance, the memory 182 may include computer system readable media in the form of volatile memory, such as random access memory (RAM) and/or cache memory. In addition, the memory 182 may also include a storage device configured to read from and write to a non-removable, non-volatile magnetic media. In some cases, the processor 180 may execute instructions stored in the memory 182.

In various embodiments, the computer 172 may communicate with one or more external devices such as the user interface 188. In some cases, the user interface 188 may include a keyboard 174, a mouse 176, and a display 178, which enable a user to interact with the computer system 152 via I/O interface 184. The computer system 152 may communicate with other computer devices (e.g. computing device 102) through one or more networks (e.g., network 150).

Figure 1B:
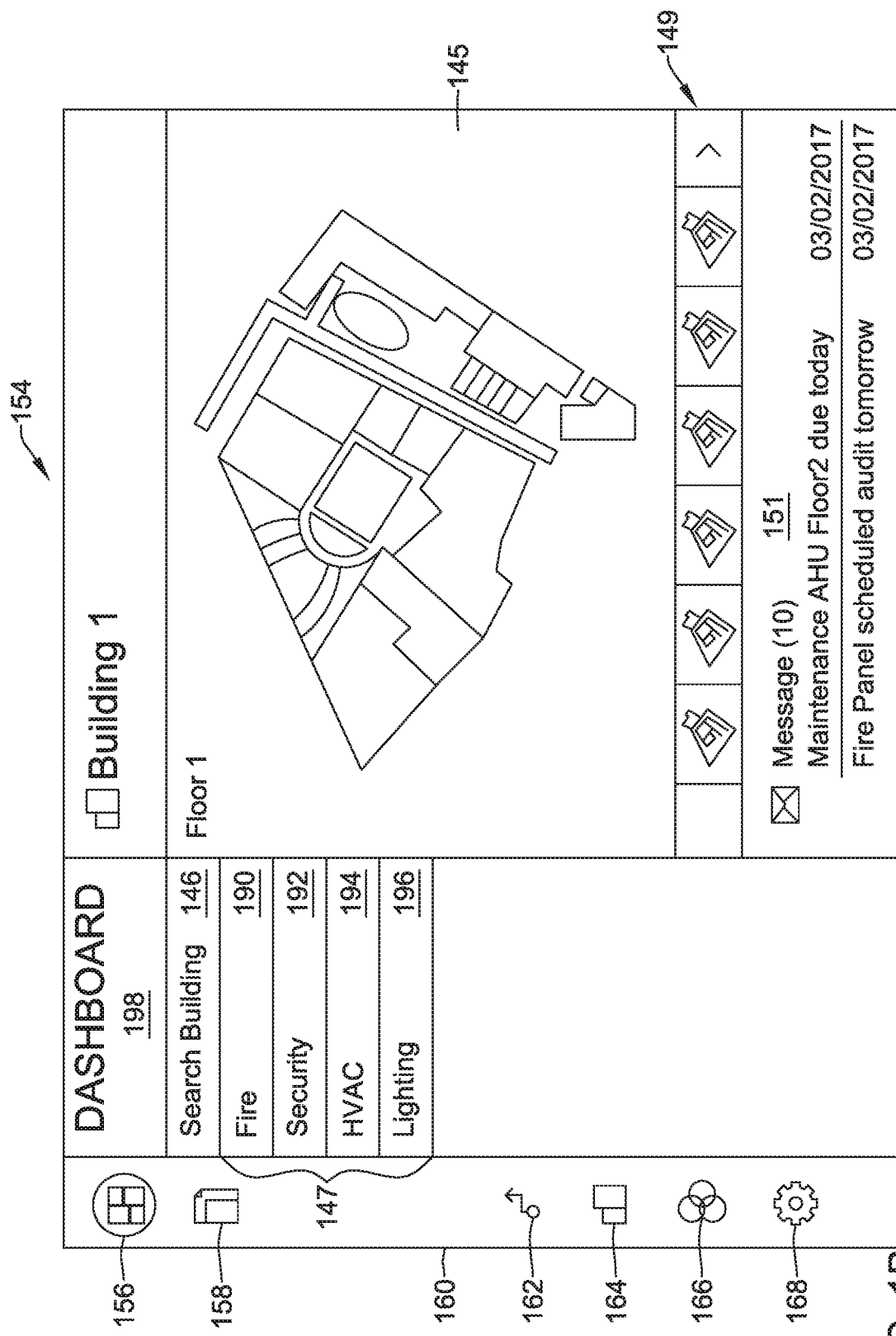
FIG. 1B shows an illustrative dashboard screen of an illustrative building automation system.

FIG. 1B depicts an exemplary building manager application 154 environment of the smart building manager 120 of FIG. 1A. According to various embodiments, the building manager application 154 may include an integrated simple to use dashboard shown generally in FIG. 1B. In some cases, the building manager application 154 may facilitate a user in making more informed decisions and have better control of the various building control components throughout the building, including building control components across different building system categories 148.

In the example dashboard screen shown in FIG. 1B, icons may be located on a sidebar 160 of the building manager application 154. The icons may include a dashboard icon 156, a health or status icon 158, a points icon 162, a zones or floors icon 164, a logic icon 166, and a settings icon 168. Each icon may be selected to display a corresponding page of the building manager application 154. In this example, the dashboard icon 156 has been selected and a corresponding dashboard page 198 is displayed. In some cases, the dashboard page 198 may provide a layered or floorplan view 145 of each floor of the building. In this example, "Floor 1" of the building is shown. In some cases, the floorplan view 145 may also display the location of the building control components of the building system categories 148 and indicate the operational status of the building control components. In some examples, a scroll bar 149 may be provided to select other floors to be displayed on the floorplan view. In some examples, "Messages" 151 may be included and provide information regarding upcoming maintenance or events for the building control components throughout the building.

In some cases, the dashboard page 198 may include a building system selections 147. In the example shown, the building system selections 147 includes a fire system selection 190, a security system selection 192, an HVAC system selection 194, and a lighting system selection 196. In some cases, the building system selections 147 may include other system selections such as, an access control system selection if provided. In some cases, each of the building system selections 147 may correspond to a respective building system category 148. When a building system selection is chosen, the operational status of only the building control components from that building system category may be shown in the floorplan view 145. For example, as shown in FIG. 1B, the fire system selection 190 is selected. As a result, the five (5) building control components from the fire system 130 located on "Floor 1" are shown or highlighted in the floorplan view 145.

The illustrative building manager application 154 of the smart building manager 120 may give provision to users to discover and add building control components from various building system categories 148, and create meaningful location (e.g., zone) and device categories to enable grouping, searching, and filtering of building control components. The building manager application 154 of the smart building manager 120 may also allow users to easily and intuitively create context based rules that can control building control components across multiple building system categories 148.

Figure 2A:
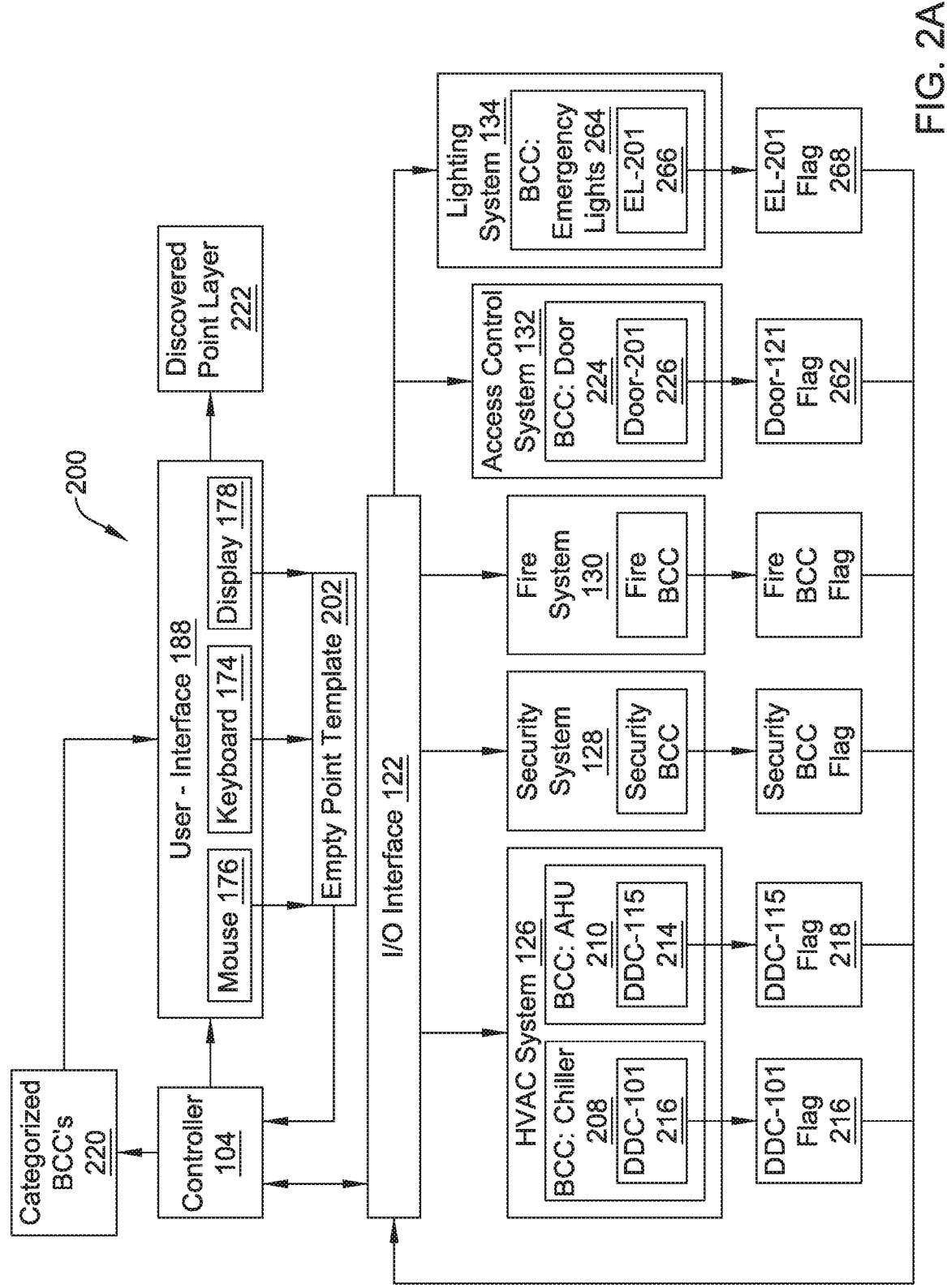
FIG. 2A is a flow diagram of an illustrative method.
Figure 2B:
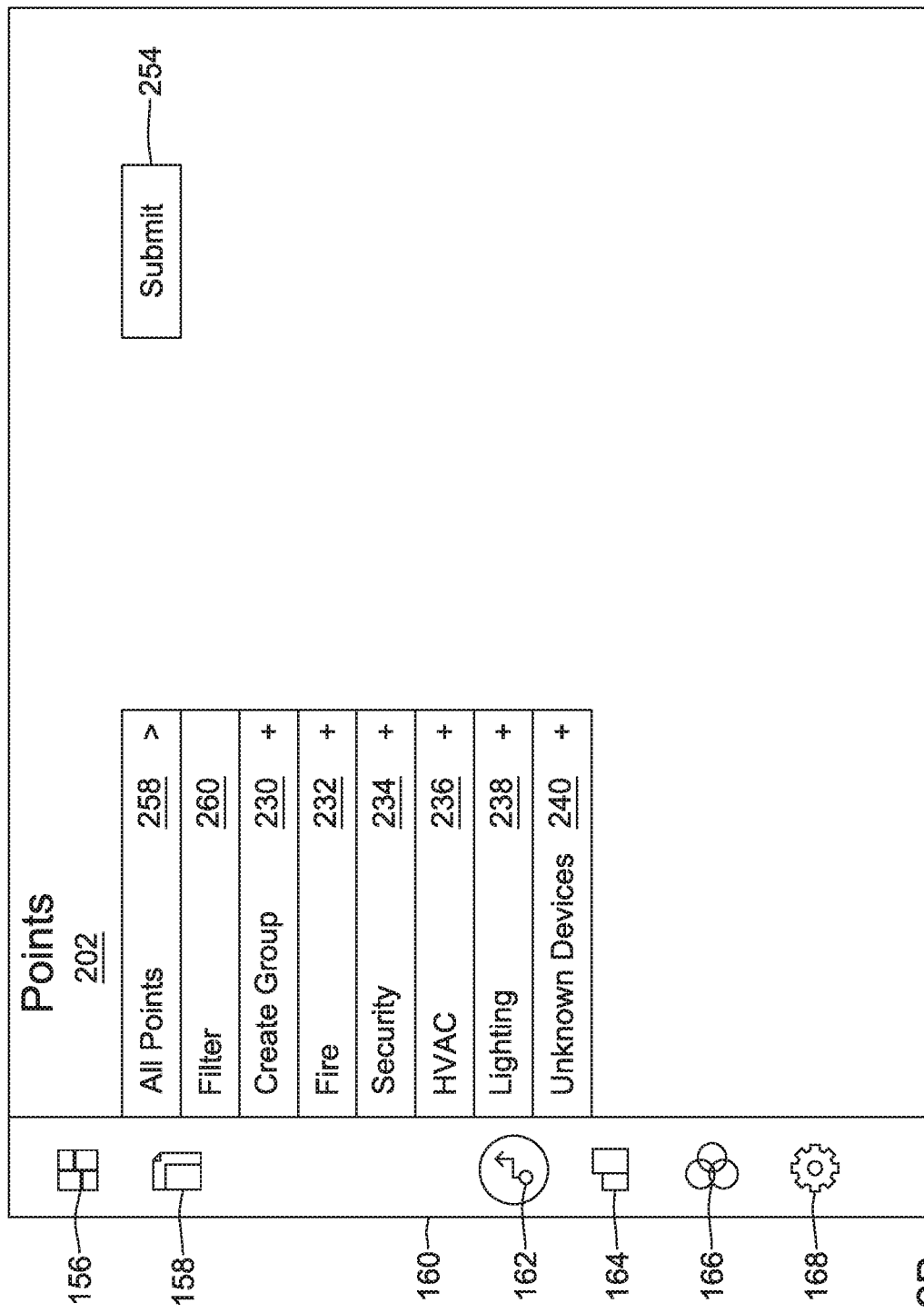
FIG. 2B is an illustrative points page screen.

FIG. 2A is a flow diagram of an illustrative method. FIG. 2A will be described in conjunction with FIGS. 2B-2D. FIG. 2A depicts an illustrative method for auto-discovering building control components of a building automation system. In some cases, the method 200 may begin with the controller 104 of the computing device 102 of FIG. 1A, using the display 178 of the user-interface 188 of the computer system 152 to display a points page 202 of the building manager application 154. FIG. 2B depicts an exemplary illustration of the points page 202. As shown, the points icon 162 along the sidebar 160 has been selected to display the points page 202. In some cases, the points page 202 may include an all points menu option 258 that when selected may display a listing of all discovered building control components (e.g. points). The points page 202 may also include a "Create Group" menu option 230, that when selected, allows a user to create customized groups for categorizing building control components. In the example shown, groups have been created for Fire 232, Security 234, HVAC 236, Lighting 238 and Unknown Device 240. It is contemplated that the installer may also categorize the discovered building control components and add the discovered building control components to an appropriate or desired group for easy user identification later in the process. A filter menu option 260 may be used to filter building control components using one or more criteria. This may be particularly useful when assigning the building control components to the various groups.

In some instances, auto-discovery may need to be initiated before the method 200 can proceed. In some cases, the points page 202 may include a selection mechanism for initiating auto-discovery. In this case, a submit button 254 may be selected to initiate auto-discovery. However, this is only one example of the initiating mechanism. In other cases, the points page 202 may include another mechanism to initiate auto-discovery. In further cases, the initiating mechanism may not be located on the points page 202.

Turning back to FIG. 2A, the mouse 176 and/or the keyboard 174 of the user-interface 188 (see FIG. 1A) may be used to select the submit button 254 (from FIG. 2B) on the points page 202 to initiate an auto-discovery procedure. In response, the controller 104 may use the I/O interface 122 (see FIG. 1A) to communicate with the building control components of the building system categories 148 (e.g., the HVAC system 126, the security system 128, the fire system 130, the access control system 132, and the lighting system 134). According to various embodiments, each building system category of the building system categories 148 that is provided in the building may include one or more building control components. In various examples, the building control components may include a set of building control components (BCCs) (e.g., fire panels, DDC controllers, intrusion panels, access card readers, lighting controllers, etc.) that each have a unique device m and device address. In some cases, the device ID may be at the firmware level (e.g. MAC address) and the device address may represent the network address of the building control component on the building automation network (e.g. accessed via I/O Interface 122).

To help integrate disparate subsystems into a more cohesive building automation system, the system may auto-discover at least two building control components from two or more different building system categories (e.g. HVAC sub-system and Fire sub-system) by communicating with the various building control components via I/O Interface 122 using two or more different protocols. In some cases, one building system category (e.g. HVAC sub-system) may use a first protocols with a first auto-discovery procedure and another building system category (e.g. Fire sub-system) may use a second protocol with a second auto-discovery procedure. The discovered building control components may be automatically categorized by the system and automatically added to the appropriate group (e.g. Fire 232, Security 234, HVAC 236, Lighting 238 and Unknown Device 240), sometimes based on the particular communication protocol used to communicate with and discover the building control component. The system may communicate with the discovered building control components and identify more information about the building control components, such as model number, capabilities, input control parameters, output control parameters, sensor readings, error codes and/or any other information that is available or desired.

In one example, and as shown in FIG. 2A, the HVAC system 126 may include a chiller 208 and an Air Handling Unit (AHU) 210. The chiller may have a device ID of DDC-101 as shown at 212, The AHU may have a device ID of DDC-115, as shown at 214. The chiller 208 may be classified as a machine that removes heat from a liquid via a vapor-compression or absorption refrigeration cycle. The Air Handling Unit (AHU) 210 may classified as a machine that regulate and circulates conditioned air in a space. In some cases, the I/O interface 122 may be configured to communicate with the chiller 208 over a BACnet and with the AHU 210 over a LonTalk network. As a result, if a device such as DDC-101 212 communicates with the I/O interface 122 using BACnet protocol, the I/O interface 122 may use the BACnet protocol to read the device ID or "flag" 216 of the DDC-101 212. Similarly, if a device such as DDC-115 214 communicates with the I/O interface 122 using LonTalk protocol, the I/O interface 122 may use the LonTalk protocol to read the device ID or "flag" 218 of the DDC-115 214. In some instances, when a device ID or flag of an individual building control component such as the DDC-101 212 or the DDC-115 214 has been read, the controller 104 may record the protocol that was used to obtain the device ID or flag. This record may then be used to automatically classify and group the discovered building control component. For instance, the controller 104 may know that BACnet is the network used to communicate with the chillers 208. Once the flag 216 for the DDC-101 212 has been obtained, the controller 104 may recognize that the BACnet protocol was used to obtain the flag 216 and as a result, categorize DDC-101 212 as a chiller 208. In addition, because the chillers 208 are classified as an HVAC subsystem, DDC-101 212 may also be categorized under the HVAC system 126. Similarly, the controller 104 may know that LonTalk is the network protocol used to communicate with the AHUs 210. Once the flag 218 for DDC-115 214 has been obtained, the controller 104 may recognize that LonTalk protocol was used to obtain the flag 218 and as a result, categorize DDC-115 212 as an AHU 210. In addition, because the AHUs 210 are classified as an HVAC subsystem, DDC-115 214 may also be categorized under the HVAC system 126. This is just one example.

In some embodiments, protocols may be used to scan the IDs of building control components from other building system categories 148 and the controller 104 may categorize the devices according to their corresponding building control component and building system category. For example, door 224 may be a building control component of the access control system 132 and emergency lights 264 may be a building control component of the lighting system 134. In some cases, the I/O interface 122 may be configured to communicate with the doors 224 over an EnOcean network and with the emergency lights 264 over a DST network. As a result, if a device such as Door-201 226 communicates with the I/O interface 122 using EnOcean protocol, the I/O interface 122 may use the EnOcean protocol to read a flag 262 of the Door-201 226. Similarly, if a device such as EL-201 266 communicates with the I/O interface 122 using DSI protocol, the I/O interface 122 may use the DSI protocol to read a flag 268 of the EL-201 266. Accordingly, the controller 104 may know that EnOcean is the network used to communicate with doors 224. Once the flag 262 for the Door-201 226 has been obtained, the controller 104 may recognize that EnOcean protocol was used to obtain the flag 262 and as a result, categorize Door-201 226 as a door 224. In addition, because the doors 224 are classified as an access control subsystem, Door-201 226 may also be categorized under the access control system 132. Similarly, the controller 104 may know that DSI is the network used to communicate with emergency lights 264. Once the flag 268 for EL-201 266 has been obtained, the controller 104 may recognize that DSI protocol was used to obtain the flag 268 and as a result, categorize EL-201 266 as an emergency light 264. In addition, because the emergency lights 264 are classified as a lighting subsystem, EL-201 266 may also be categorized under the lighting system 134.

In certain embodiments, although the I/O interface 122 may be capable communicating with a particular building control component over a network, the I/O interface 122 may not be capable of using the protocol to categorize all of the building control components. In such cases, the controller 104 may by default categorize un-categorized building control component under an unknown device category. In these cases, the particular building control component may be placed under the unknown devices selection 240 (from FIG. 2B). In some cases, a user may manually add the unknown building control components wider the unknown devices selection 240 to the desired category.

Figure 2D:
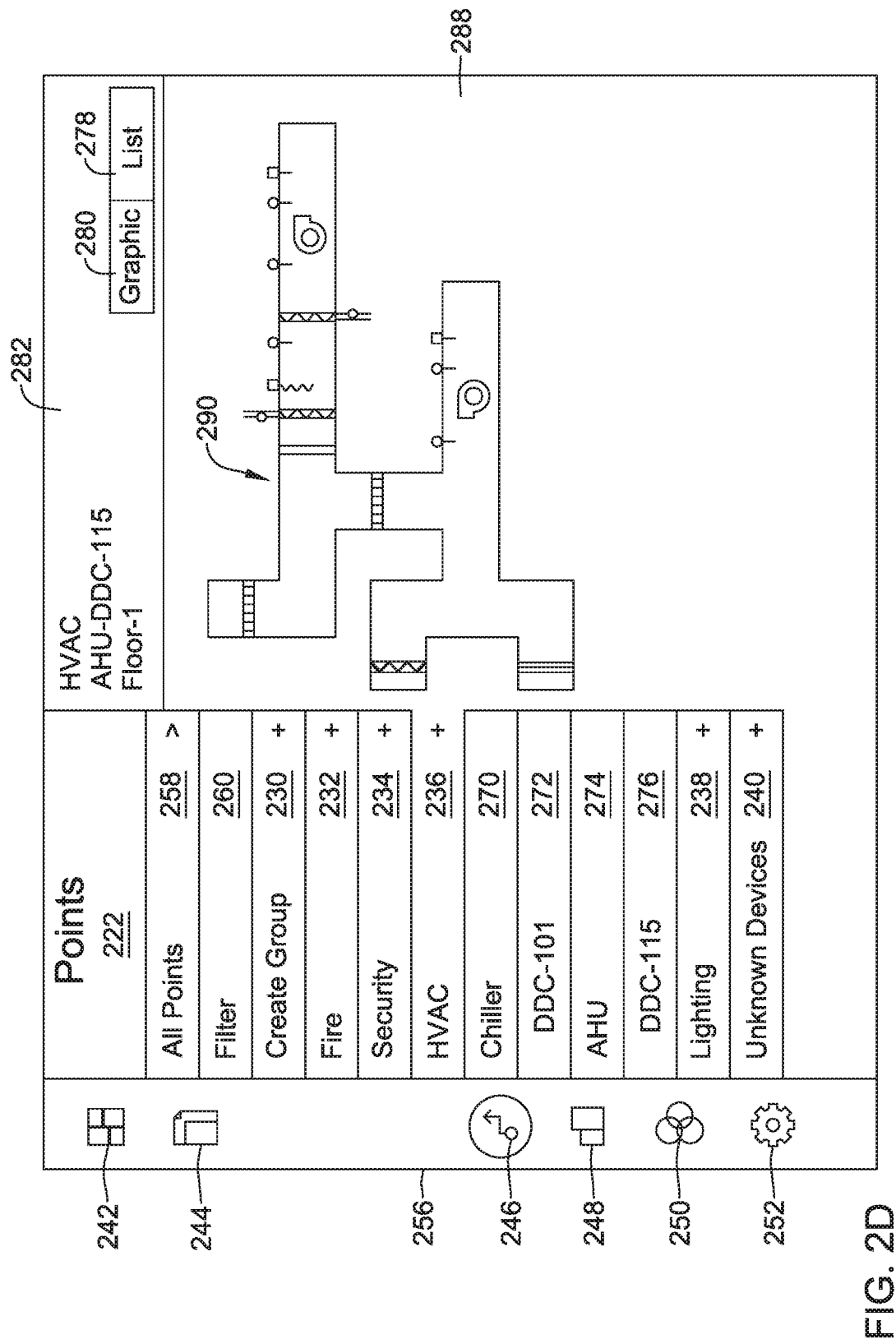
FIG. 2D is an illustrative discovered points page screen in a graphic mode.

In various embodiments, after the building control component have been categorized, the controller 104 may use the display 178 of the user-interface 188 of the computer system 152 (see FIG. 1A) to display the categorized building control components on a discovered points page 222 of the building manager application 154, as shown in FIG. 2C. As shown, the HVAC category 236 has been expanded to show a chiller category 270 that includes the chiller 208 (from FIG. 2A) and an AHU category 274 that includes the AHU 210 (from FIG. 2A). FIG. 2C also shows building control component DDC-101 272 as being selected. When a building control component is selected, various parameters 286 of the selected building control component are displayed in a parameter region 284. In FIG. 2C, the parameters are displayed in a list format. In FIG. 2D, the parameters 286 are shown in a graphical format. In the example shown, each of the various parameters 286 may include: "Point Label", a "State", and a "Value", and the list screen 284 may display the "State" status and "Value" status for each "Point Label".

The discovered points page 222 may also have a title bar 282 that may display the selected building system category HVAC) and the selected building control component (AHU DDC-115). In certain embodiments, the building manager application 154 may be used to create subcategories of the building system categories. For example, in some cases, a zones or floors icon 248 may be selected to display a zone or floor (not shown). The zone or floor may then be utilized to group the various building control components across the building system categories into their respective zone or floor category. For instance, DDC-115 214 may be located on the first floor of a building. As a result, DDC-115 214 may be placed in a first floor AHU subcategory. Accordingly, as shown in FIG. 2C, when the DDC-115 276 is selected, the title bar 282 may also display the floor category "Floor-1", for example. It is contemplated that each building control components may be placed in two or more categories. For example, a building control component may be placed in a building system category (e.g. HVAC), a sub-category of a building system category (e.g. AHU sub-category of the HVAC category), and a zone category (e.g. first floor). This can help a user more easily identify building control components by allowing a user to identify those building components that are a member of a particular category or sub-category.

As can be seen, the title bar 282 may also include a "Graphic" button 280 and a "List" button 278. When selected, the discovered points page 222 may display the corresponding screen format. In FIG. 2C, the "List" button is selected and as a result, a list screen 284 is displayed. In FIG. 2D, the "Graphic" button 280 is selected and as a result, a graphic screen 288 is displayed. In certain embodiments, the graphic screen 288 may display a depiction 290 of the selected building control component i.e., DDC-115 214), as well as a location within the selected building control component of each of the parameters (e.g. the parameters identified in the list screen).

To help non-programmers add intelligence to the building automation system, a user may be allowed to define a number of customized rules for execution by the building automation system. To define a rule, the user may be presented with a plurality of predefined triggers, and the user may select one of the predefined triggers. A plurality of corresponding predefined actions for the selected predefined trigger may then be presented, and the user may select one or more of the predefined actions. In some cases, the user may also assign certain ones of the building control components of the building automation system to the rule. During subsequent operation of the building automation system, the predefined trigger may be detected, and in response, the selected one or more predefined actions may be performed on the assigned building control components. In some cases, a rule may perform predefined actions on building control components from two or more building system categories (e.g. HVAC sub-system, Fire sub-system, Lighting sub-system, Security sub-system, etc.).

Figure 3A:
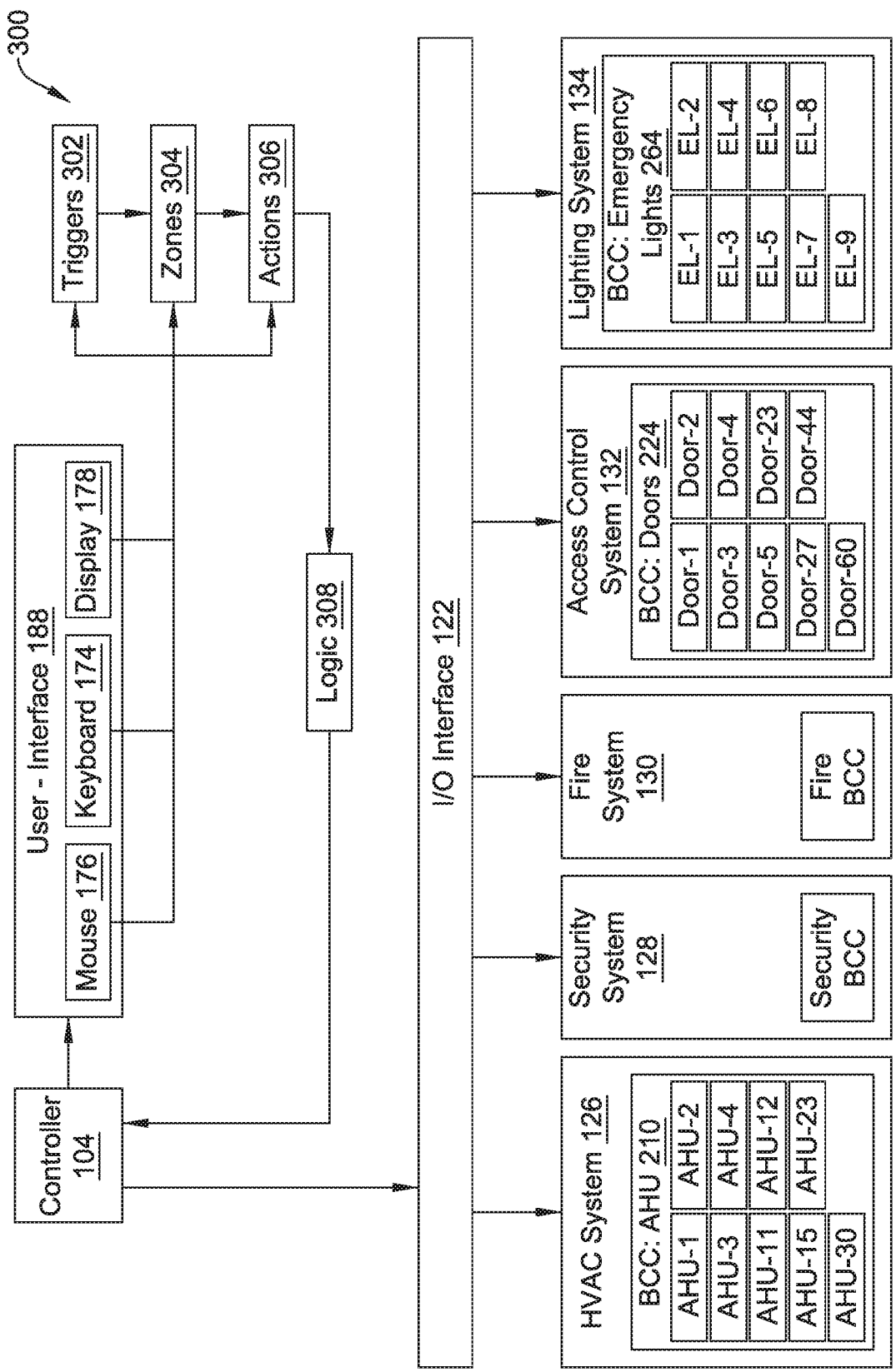
FIG. 3A is a flow diagram of an illustrative method.

FIG. 3A is a flow diagram of an illustrative method of defining one or more rules. FIG. 3A will be described in conjunction with FIGS. 3B-3F. In some cases, If-This-Then-That (IFTTT) principles may be utilized, and a user may be able to instruct the building automation system without knowing a particular programming language, assembly language, or machine language. Furthermore, the user may not have to have knowledge of or use a functional block building methodology.

Figure 3B:
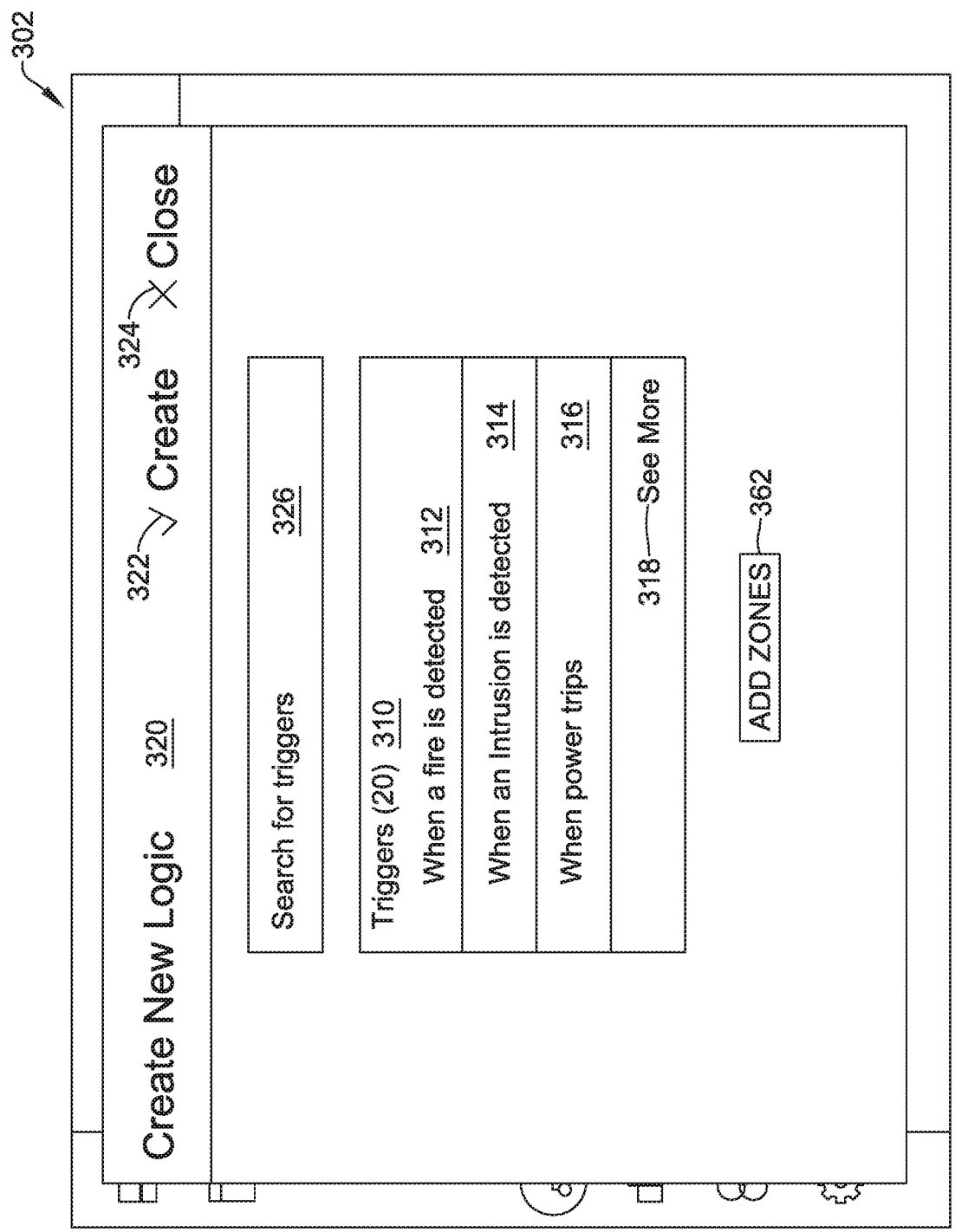
FIG. 3B is an illustrative trigger page screen.

In certain embodiments, the illustrative method 300 may begin with the controller 104 using the display 178 of the user-interface 188 of the computer system 152 to present a trigger page 302 of the building manager application 154, such as shown in FIG. 3B. As shown in FIG. 3B, a list of predefined triggers 310 or events may be displayed. In the example shown, the list of predefined triggers 310 include "When a fire is detected" 312, "When an intrusion is detected" 314, and "When power trips" 316. In some cases, more predefined triggers 310 may be viewed by selecting a "SEE MORE" link 318. In other cases, a different mechanism may be provided to see an extended list of predefined triggers 310. In further cases, the mouse 176 and/or the keyboard 174 of the user-interface 188 (from FIG. 3A) may be utilized to provide definitions to user defined triggers. The user defined triggers may then be included on the trigger page 302. In addition, the predefined triggers 310 and user defined triggers may be searched using a "Search for triggers" tool bar 326, for example. In other cases, a different mechanism may be provided to search the predefined triggers 310 and/or user defined triggers. In the example shown, an "ADD ZONES" button 362 is provided. In some cases, the mouse 176 and/or the keyboard 174 of the user-interface 188 may be used to select the "ADD ZONES" button 362 to advance the method 300. In other cases, a different mechanisms may be provided to advance the method 300, such as a Next button.

Figure 3C:
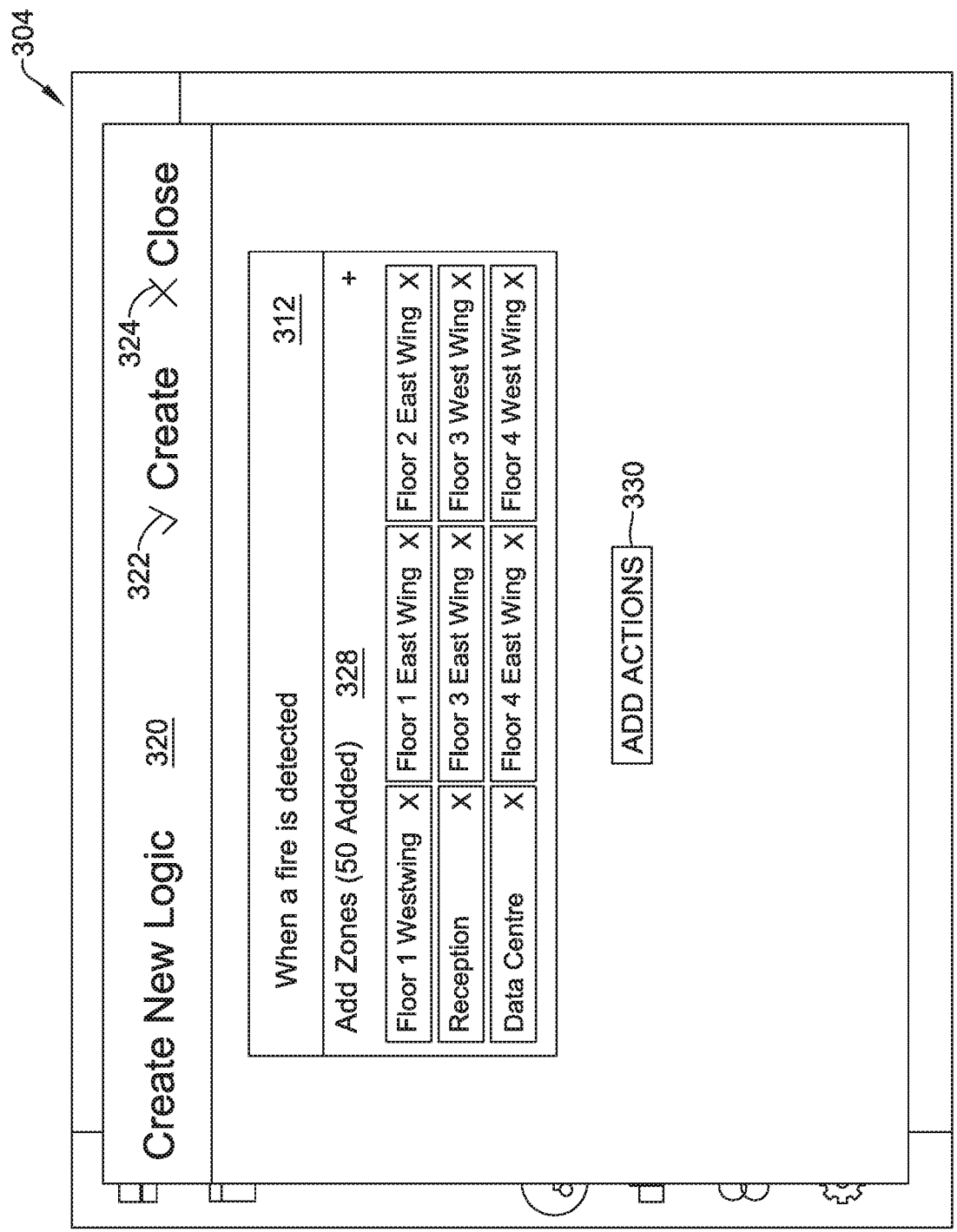
FIG. 3C is an illustrative zones page screen.

Referring back to FIG. 3A, once a trigger 310 has been chosen, and the "ADD ZONES" mechanism has been selected, the controller 104 may use the display 178 of the user-interface 188 to present an add zones page 304 of the building manager application 154. FIG. 3C depicts an illustrative add zones page 304. As shown, in this example, the "When a fire is detected" 312 trigger has been selected. The add zones page 304 allows the user to identify which zones this trigger should act upon by adding (+) "zones" into zones box 328. The "zones" that are chosen may correspond to areas, floors, rooms, etc. of the building that contain the building control components that the user wants to control in response to the selected trigger. In some cases, the "zones" may be dragged from a "zone bank" (not shown) and dropped into the zones box 328. As shown in FIG. 3C, 50 "zones" have been added (not all shown) and they include: "Floor 1 West Wing", "Floor 1 East Wing", "Floor 2 East Wing", "Reception", "Floor 3 East Wing", "Floor 3 West Wing", "Data Centre", "Floor 4 East Wing", and "Floor 4 West Wing".

Once the desired zones are selected, the user may select an "ADD ACTIONS" button 330. In some cases, the mouse 176 and/or the keyboard 174 of the user-interface 188 may be used to select the "ADD ACTIONS" button 330 to advance the method 300. In other cases, different mechanisms may be provided to advance the method 300.

Figure 3D:
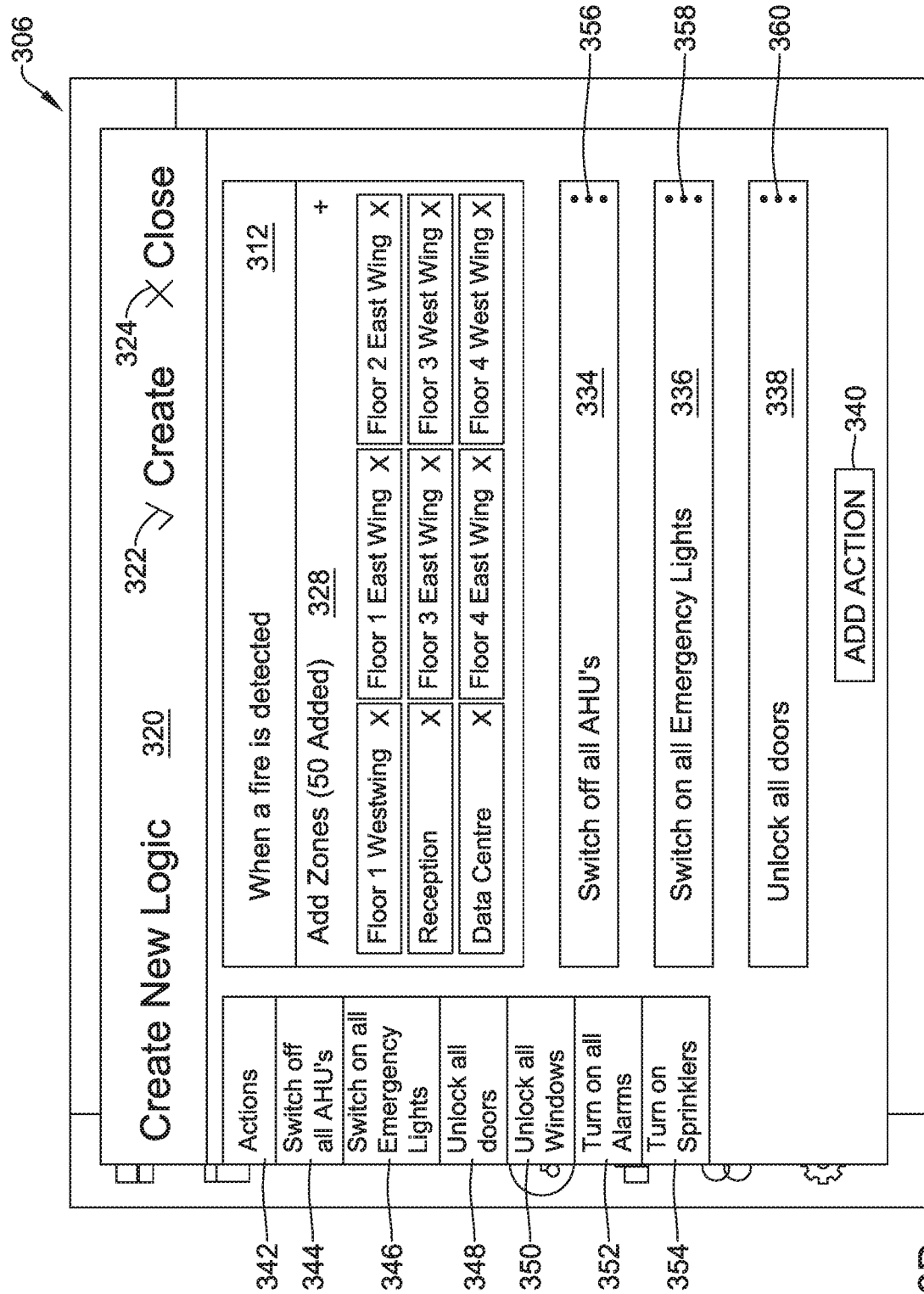
FIG. 3D is an illustrative actions page screen.

Referring back to FIG. 3A, once the "zones" have been placed in the zones box 328 and the "ADD ACTIONS" button 330 has been selected, the controller 104 may use the display 178 of the user-interface 188 to present an "actions" page of the building manager application 154. FIG. 3D depicts an exemplary "actions" page 306. In this example, as previously stated, for the "When a fire is detected" 312 trigger, the following "zones" have been selected: "Floor 1 West Wing", "Floor 1 East Wing", "Floor 2 East Wing", "Reception", "Floor 3 East Wing", "Floor 3 West Wing", "Data Centre", "Floor 4 East Wing", and "Floor 4 West Wing". As a result, the user may be allowed to select any of the building control components located in those "zones" and prescribe them with an action.

In the example shown, the "When a fire is detected" 312 trigger may correspond to the "If-This" principle of the IFTTT principles. Accordingly, an actions page 306 may provide a set of actions to be performed by the building control components when a fire is detected. These actions may correspond to the "Then-That" principle of the IFTTT principles. In this embodiment, the actions page 306 may have an Actions bank 342 that includes a set of predefined actions. In some instances, the Actions bank 342 may include a "Switch off all AHUs" selection 344, a "Switch on all Emergency Lights" selection 346, an "Unlock all doors" selection 348, an "Unlock all windows" selection 350, a "Turn on all alarms" selection 352, and a "Turn on sprinklers" selection 354. This is only an example of the Actions bank 342 and any configuration for which "actions" may be selected is suitable.

Figure 3E:
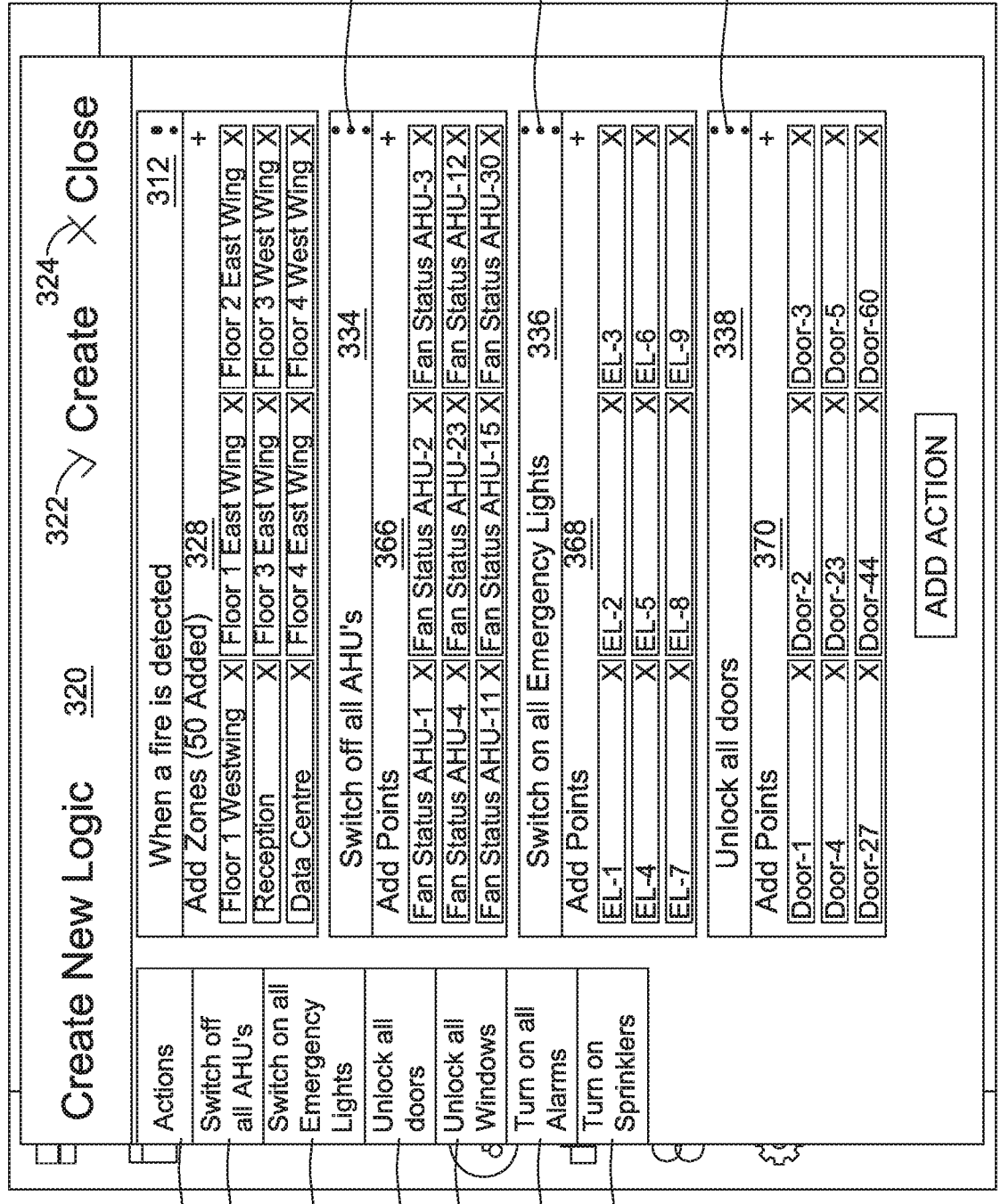
FIG. 3E is an illustrative actions page screen in an expanded mode screen.
Figure 3F:
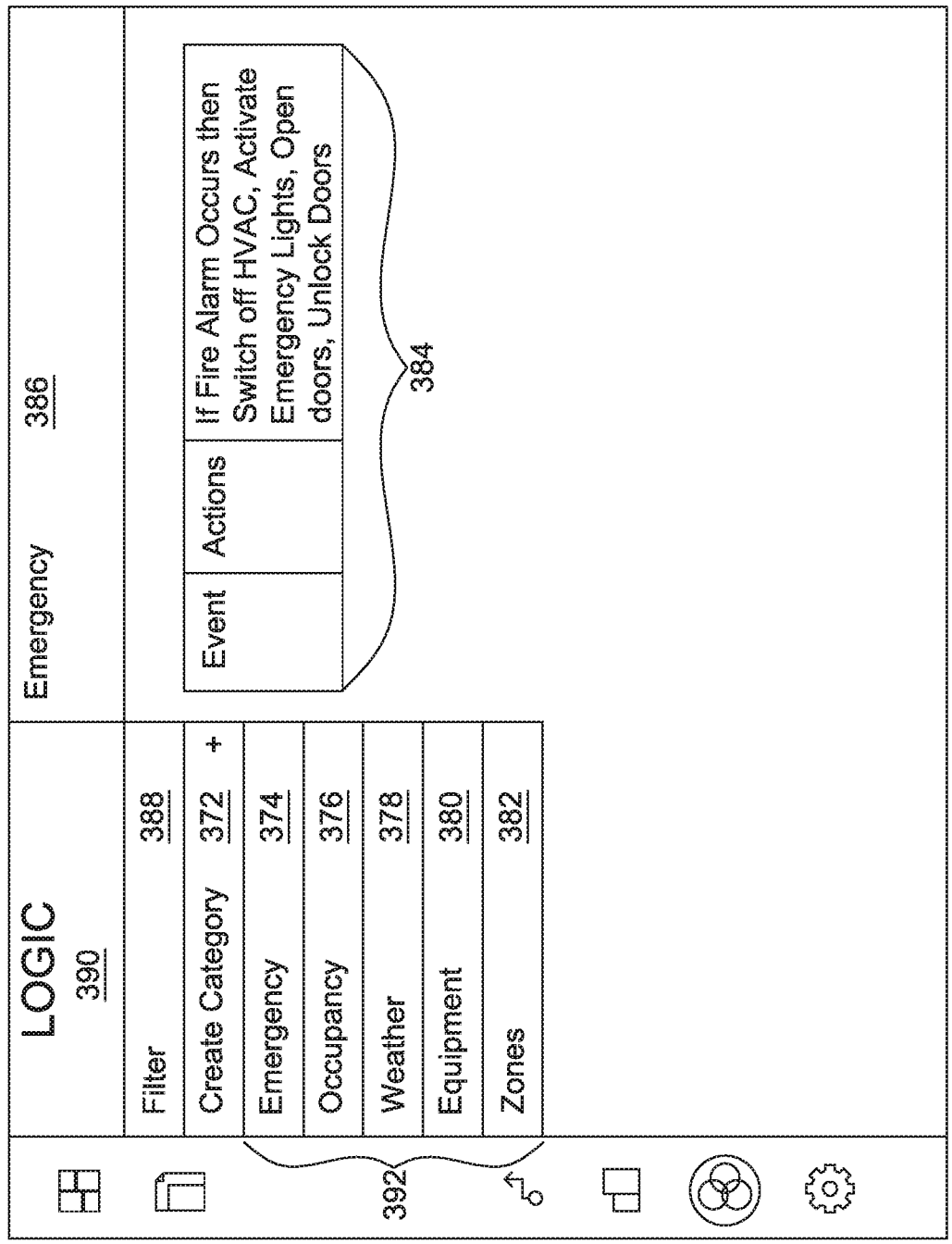
FIG. 3F is an illustrative logic or rules screen.

In various embodiments, the mouse 176 and/or the keyboard of the user-interface 188 may be used to select one or more of the actions from the Actions bank 342 and then select an "ADD ACTION" button 340 to place a corresponding field in the actions page 306. For example, as shown in FIG. 3D, the "Switch off all AHUs" selection 344, the "Switch on all Emergency Lights" selection 346, and the "Unlock all doors" selection have all been selected, and the "ADD ACTION" button 340 has been pressed. As a result, a "Switch off all AHUs" field 334, a "Switch on all Emergency Lights" field 336, and an "Unlock all doors" field 338 have been placed on the actions page 306. In some cases, each field may have a corresponding expansion icon 356, 358, and 360. As shown in FIG. 3E, when the expansion icons 356, 358, and 360 are selected, the corresponding "Switch off all AHUs" field 334, the "Switch on all Emergency Lights" field 336, and the "Unlock all doors" field 338 may be expanded. When in the expanded state, each field may be configured to accept points or building control components in their respective "Add Points" boxes 366, 368, and 370. The building control components chosen may correspond to building control components in the building that will be controlled according to the fields 334, 336, and 338 that contain the building control components. In some cases, each field 334, 336, and 338 may have their own "building control components bank" (not shown) and the building control components may be dragged from the "building control components bank" and dropped into their "Add Points" box.

For example, the "Switch off all AHUs" field 334 may have a bank that includes all of the AHUs in the "zones" that are in the zones box 328. The user may then drag an AHU from the AHU "building control components hank" and drop it in the "Add Points" box 366. As shown in FIG. 3E, "Fan Status AHU-1", "Fan Status AHU-2", "Fan Status AHU-3", "Fan Status AHU-4", "Fan Status AHU-23", "Fan Status AHU-12", "Fan Status AHU-11", "Fan Status AHU-15", and "Fan Status AHU-30" have been dragged and dropped into the "Add Points" box 366. Similarly, the "Switch on all Emergency Lights" field 336 may have a bank that includes all of the Emergency Lights that are in the "zones" that are in the zones box 328. The user may then drag an Emergency Light from the Emergency Lights "building control components bank" and drop it in the "Add Points" box 368. As shown in FIG. 3E, "EL-1", "EL-2", "EL-3", "EL-4", "EL-5", "EL-6", "EL-7", "EL-8", and "EL-9" have been dragged and dropped in the "Add Points" box 368. Similarly, the "Unlock all doors" field 338 may have a bank that includes all of the Doors that are also in the "zones" that are in the zones box 328. The user may then drag a Door from the Doors "building control components bank" and drop it in the "Add Points" box 370. As shown in FIG. 3E, "Door-1", "Door-2", "Door-3", "Door-4", "Door-23", "Door-5", "Door-27", "Door-44", and "Door-60" haven been dragged and dropped in the "Add Points" box 370.

In the example shown, a top bar 320 is provided in the building manager application 154. The top bar 320 may include a "Create" mechanism 322 and a "Close" mechanism 324. In some cases, the mouse 176 and/or the keyboard 174 of the user-interface 188 may be used to select the "Close" mechanism 324 to exit method 300, or select the "Create" mechanism 322 to advance method 300. In other cases, different mechanisms may be provided to either exit and/or advance the method 300.

Referring back to FIG. 3A, in some cases, once the "actions" and the building control components have been chosen, the user may then use the mouse 176 and/or the keyboard 174 of the user-interface 188 to select the "Create" mechanism 322 to create and send logic 308 to the controller 104. The logic may be considered a rile, Turning to FIG. 3F, in some instances, the display 178 may display a logic or rules page 390 of the building manager application 154 that shows the logic 308 (or rules) sent to the controller 104. As shown, the logic icon 166 has been selected to display the logic page 390. In some cases, the logic page 390 may include a menu 392 that may display a set of categories. In this case, the menu 392 includes an emergency category 374, an occupancy category 376, a weather category 378, an equipment category 380, and a zones category 382. The categories may be used to group the triggers for which the user has defined a set of actions to be performed by a set of building control components of the building automation system. For example, in this case, the emergency category 374 has been selected. As shown, an logic or rule summary 384 may be displayed in a summary display screen 386 to represent that the "When a fire is detected" 312 trigger has been defined and categorized in the emergency category 374. The other categories 376, 378, 380 and 382 may have similar summary display screens. For example, the occupancy category 376 may have a summary display screen that displays an logic or rule summary of a "When an individual is sensed in a room" trigger. In addition, in some examples, some of the categories may be hidden from view using a filter 388. Also different categories may be added by the user using create category button 372.

Referring back to FIG. 3A, in various embodiments, when the logic 308 (or rule) has been created, the controller 104 may use the logic 308 (or rule) to instruct the building automation system. For instance, the controller 104 may detect an occurrence of the selected trigger, and then use the I/O interface 122 to communicate with the various building control components in the building system categories 148 and direct the selected building control components to perform the selected "actions". For example, the controller 104 may detect that there is a fire in the building and perform each of the actions on each of the selected building control components for the "When a fire is detected" 312 trigger. That is, the controller 104 may use the I/O interface 122 to turn off the following AHUs 210: "AHU-1", "AHU-2", "AHU-3", "AHU-4", "AHU-23", "AHU-12", "AHU-11", "AHU-15", and "AHU-30". The controller 104 may also use the I/O interface 122 to unlock the following Doors 224: "Door-1", "Door-2", "Door-3", "Door-4", "Door-23", "Door-5", "Door-27", "Door-44", and "Door-60". The controller 104 may also use the I/O interface 122 to turn on the following emergency lights 264: "EL-1", "EL 2", "EL-3", "EL-4", "EL-5", "EL-6", "EL-7", "EL-8", and "EL-9".

In another example, logic 308 may have been created and provided to the controller 104 that defines the following: If a theft is detected, then close all the doors located in the zone where the theft is occurring, generate an emergency alert to security/local authorities, and send an alert to the building security and/or building owners. In another example, logic 308 may have been created and provided to the controller 104 that defines the following: If the air conditioning system stop working, then send an immediate alert (SMS and/or email) to maintenance vendor and facility manager, observe for fixed status update, and log entry on the building manager application 154 platform. In another example, logic 308 may have been created and provided to the controller 104 that defines the following: If a building control component has not had maintenance for one month, then use the building's communication system to send an immediate alert to the building owner and vendor, observe for a maintenance update, and log the entry on the building manager application so that a systems operator may be notified of the event.

In certain embodiments, a category selection (from FIG. 3F) may be given priority over other category selections if or when multiple triggers occur at one time. For example, the emergency category 374 may be given top priority over all other categories. As a result, if a fire is sensed in the building at the same time that an individual is sensed in a room, the controller 104 may execute the logic that corresponds to the "When a fire is detected" 312 trigger, and ignore or delay the logic for the "When an individual is sensed in a room" trigger.

Figure 4:
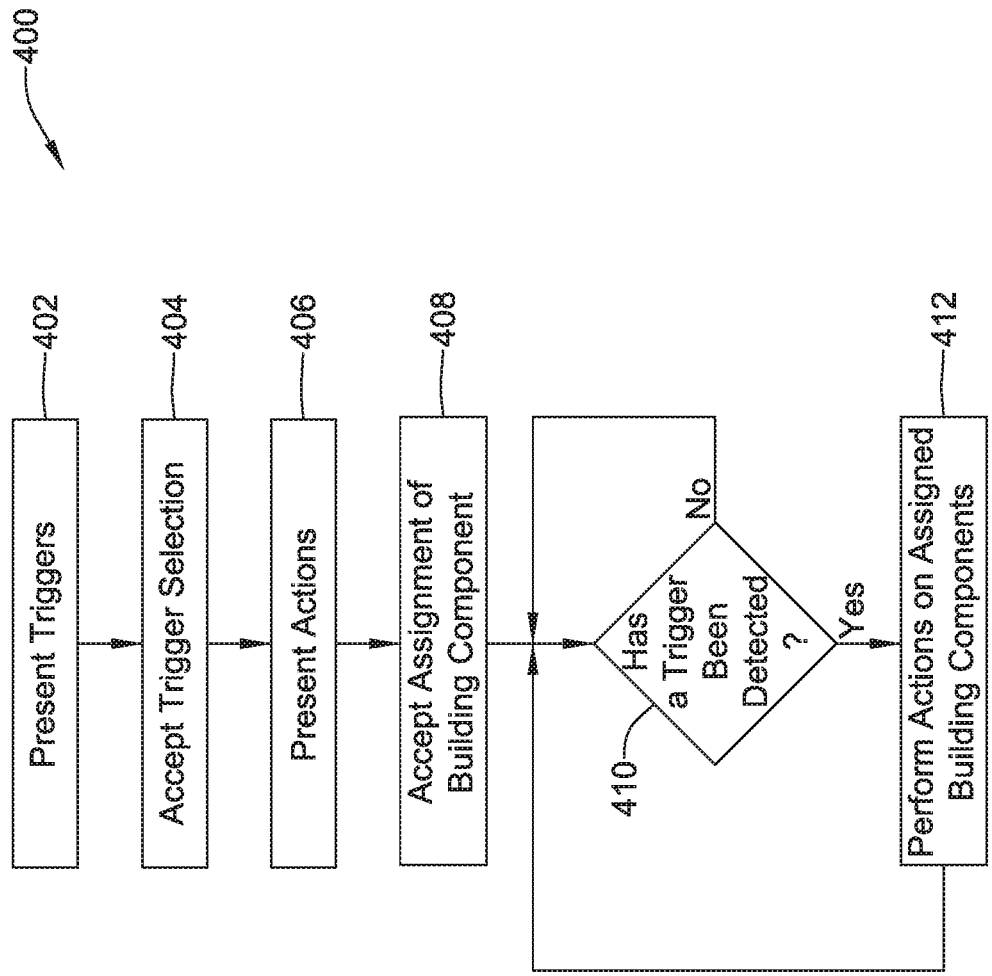
FIG. 4 is a flow diagram of an illustrative method.

FIG. 4 illustrates an illustrative method 400 for defining trigger actions in a building automation system that has a plurality of building control components from two or more different building system categories including an HVAC system, a security system, a fire system, an access control system, and a lighting system. The method 400 begins at step 402, where a plurality of predefined triggers may be presented using a user interface. At step 404, a selection of one of the plurality of predefined triggers may be accepted using the interface. At step 406, a plurality of corresponding predefined actions may be presented for the selected predefined trigger using the user interface. At step 408, an assignment of one or more of the plurality of building control components may be accepted for each of the plurality of corresponding predefined actions. In some example, at least one of the plurality of corresponding predefined actions may only accept an assignment of the one or more of the plurality of building control components from only one of the two or more different building system categories, although this is not required.

Step 410 determines if the selected predefined trigger has been detected. If the predefined trigger has been detected, at step 412, the plurality of corresponding predefined actions may be automatically performed on each of the one or more assigned building control components. If, however, the predefined trigger has not been detected, method 400 may repeat step 410 to determine if the selected predefined trigger has been detected. The method shown in FIG. 4 is merely illustrative.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

Other Examples

In an example of the disclosure, a building automation system for a building may include an I/O interface for communicating with a plurality of building control components of the building, a user interface, and a controller operatively coupled to the I/O interface and the user interface. The controller may be configured to present via the user interface a plurality of predefined triggers, accept a selection of one of the plurality of predefined triggers via the user interface, and may present via the user interface a plurality of corresponding predefined actions. In some cases, for each of the plurality of corresponding predefined actions, the building automation system may accept an assignment of one or more of the plurality of building control components. The plurality of building control components may include building control components from two or more different building system categories such as a Heating, Ventilation and/or Air Conditioning (HVAC) system, a security system, a fire system, an access control system, and a lighting system. During subsequent operation of the building automation system, the controller may be configured to detect an occurrence of the selected predefined triggers, and in response, may perform each of the plurality of corresponding predefined actions on each of the one or more assigned building control components.

Alternatively or additionally to any of the embodiments above, for at least one of the plurality of predefined actions, the controller may be configured to accept an assignment of one or more of the plurality of building control components from only one of the two or more different building system categories. Alternatively, for at least one of the plurality of predefined actions, the controller may be configured to accept an assignment of one or more of the plurality of building control components from two or more of the two or more different building system categories.

Alternatively or additionally to any of the embodiments above, at least some of the plurality of building control components of the building may be assigned to one of a plurality of zones within the building, and wherein the controller may be configured to present via the user interface a plurality of zones, accept a selection of one of the plurality of zones via the user interface; and for the selected one of the predefined triggers, present via the user interface a plurality of corresponding predefined actions, wherein for each of the plurality of corresponding predefined actions, accept an assignment of one or more of the building control components that correspond to the selected zone.

Alternatively or additionally to any of the embodiments above, the controller may be configured to accept via the user interface a definition of one or more predefined triggers (user defined triggers).

Alternatively or additionally to any of the embodiments above, for the selected one of the predefined triggers, a plurality of corresponding predefined actions may be presented sometimes including one or more user defined actions, wherein for each of the plurality of corresponding predefined actions, an assignment of one or more of the plurality of building control components may be accepted.

Alternatively or additionally to any of the embodiments above, the plurality of predefined triggers may include one or more of a detection of a fire, a detection of an intrusion, and a detection of an interruption in power to the building.

Alternatively or additionally to any of the embodiments above, the plurality of building control components may include one or more Air Handling Units (AHU) of a Heating, Ventilation and/or Air Conditioning (HVAC) system, and the plurality of corresponding predefined actions may include switching off one or more of the AHUs.

Alternatively or additionally to any of the embodiments above, the plurality of building control components may include one or more emergency lights of a lighting system, and the plurality of corresponding predefined actions may include switching on one or more of the emergency lights.

Alternatively or additionally to any of the embodiments above, the plurality of building control components may include one or more door locks of an access control system, and the plurality of corresponding predefined actions may include unlocking or locking one or more of the door locks.

Alternatively or additionally to any of the embodiments above, at least two of the plurality of building control components may be from two or more different building system categories including a Heating. Ventilation and/or Air Conditioning (HVAC) system, a security system, a fire system, an access control system, and a lighting system, and the controller is configured to auto-discover the at least two building control components from two or more different building system categories by communicating via the I/O interface using two or more different protocols.

Alternatively or additionally to any of the embodiments above, the two or more different protocols may be two or more different building automation protocols.

Alternatively or additionally to any of the embodiments above, the two or more building automaton protocols may include two or more of 1-Wire, BACnet, C-Bus, CC-Link Industrial Networks, DALI, DSI, Dynet, EnOcean, KNX, LonTalk, Modbus, oBIX, VSCP, xAP, X10, Z-Wave, Zig-Bee, and INSTEON, DC-09, DALI, and Ethernet.

Alternatively or additionally to any of the embodiments above, the controller may be configured to automatically categorize at least one of the building control components that are auto-discovered based, at least in part, on which of the two or more different protocols was used to auto-discover the at least one building control component.

Alternatively or additionally to any of the embodiments above, the at least one of the building control components that are automatically categorized may be sorted on the user interface by building system category to aid the user in finding and assigning the at least one of the building control components to a selected predefined action.

Alternatively or additionally to any of the embodiments above, the controller may be configured to display building control components from two or more different building system categories on a floorplan of the building, and wherein the controller may be further configured to allow selection of a building system category and may only display an operational status of the building control components of the selected building system category.

Alternatively or additionally to any of the embodiments above, the I/O interface and controller may be part of a server.

Another example of the disclosure include a non-transitory computer-readable storage medium with an executable program stored thereon. The executable program may be configured to instruct a building automation system to present via a user interface a plurality of predefined triggers for selection by a user. A selection of one of the plurality of predefined triggers may be accepted via the user interface. For the selected one of the predefined triggers, the executable program may present via the user interface a plurality of corresponding predefined actions, wherein for each of the plurality of corresponding predefined actions, an assignment of one or more of the plurality of building control components may be accepted. During subsequent operation of the building automation system, an occurrence of the selected one of the predefined triggers may be detected, and in response, the executable program may perform each of the plurality of corresponding predefined actions on each of the corresponding assigned building control components.

Alternatively or additionally to any of the embodiments above, the plurality of building control components may include building control components from two or more different building system categories, including a Heating, Ventilation and/or Air Conditioning (HVAC) system, a security system, a fire system, an access control system, and a lighting system. In some cases, for at least one of the plurality of predefined actions, an assignment may be accepted of one or more of the plurality of building control components from only one of the two or more different building system categories. In some cases, for at least one of the plurality of predefined actions, an assignment may be accepted of one or more of the plurality of building control components from two or more different building system categories.

In another example of the disclosure, a method for defining trigger actions in a building automation system includes presenting via a user interface a plurality of predefined triggers, and accepting a selection of one of the plurality of predefined triggers via the user interface. For the selected one of the predefined triggers, a plurality of corresponding predefined actions may be presented to the user via the user interface, wherein for each of the plurality of corresponding predefined actions, an assignment of one or more of a plurality of building control components may be accepted via the user interface. In some cases, for at least one of the plurality of predefined actions, an assignment may be accepted of one or more of the plurality of building control components from only one of two or more different building system categories. In some cases, for at least one of the plurality of predefined actions, an assignment may be accepted of one or more of the plurality of building control components from two or more different building system categories. In any event, during subsequent operation of the building automation system, an occurrence of the selected one of the predefined triggers may be detected, and in response, each of the plurality of corresponding predefined actions may be performed on each of the corresponding one or more assigned building control components.

What is claimed is:

1. A building automation system for a building, comprising:
    an I/O interface for communicating with a plurality of building control components of the building;
    a user interface;
    a controller operatively coupled to the I/O interface and the user interface, the controller including one or more processors that execute instructions that cause the controller to:
        present via the user interface a plurality of predefined triggers;
        accept via the user interface a selection of one of the plurality of predefined triggers;
        for the selected one of the plurality of predefined triggers, present via the user interface a plurality of zones of the building automation system;
        accept via the user interface an assignment of one or more of the plurality of zones of the building automation system to the selected one of the plurality of predefined triggers;
        identify a plurality of predefined actions that correspond to the selected one of the plurality of predefined triggers;
        present via the user interface the plurality of predefined actions that are identified as corresponding to the selected one of the plurality of predefined triggers;
        accept via the user interface a selection of one or more of the plurality of predefined actions identified as corresponding to the selected one of the plurality of predefined triggers;
        identify which of the plurality of building control components correspond to each of the one or more of the plurality of zones assigned to the selected one of the plurality of predefined triggers;
        identify which of the plurality of building control components correspond to the selected one or more of the plurality of predefined actions;
        for each of the selected one or more of the plurality of predefined actions for the selected one of the plurality of predefined triggers:
            present via the user interface one or more of the plurality of building control components that correspond to both: (1) the corresponding one of the selected one or more of the plurality of predefined actions; and (2) the corresponding one or more of the plurality of zones assigned to the selected one of the plurality of predefined triggers;

accept an assignment of one or more of the plurality of building control components presented via the user interface; and during subsequent operation of the building automation system, the one or more processors cause the controller to detect an occurrence of the selected one of the plurality of predefined triggers, and in response, perform each of the predefined actions selected for the selected one of the plurality of predefined triggers using the one or more building control components assigned to the corresponding predefined action.

2. The building automation system of claim 1, wherein the plurality of building control components comprise building control components from two or more different building system categories including a Heating, Ventilation and/or Air Conditioning (HVAC) system, a security system, a fire system, an access control system, and a lighting system.

3. The building automation system of claim 1, wherein the plurality of building control components comprise building control components from two or more different building system categories including a Heating, Ventilation and/or Air Conditioning (HVAC) system, a security system, a fire system, an access control system, and a lighting system, and wherein for at least one of the plurality of predefined actions, the one or more processors cause the controller to accept an assignment of one or more of the plurality of building control components from only one of the two or more different building system categories.

4. The building automation system of claim 1, wherein the one or more processors cause the controller to accept via the user interface a definition of one or more user defined triggers.

5. The building automation system of claim 1, for the selected one of the predefined triggers, present via the user interface one or more user defined action wherein for each of the one or more user defined action, accept an assignment of one or more of the plurality of building control components.

6. The building automation system of claim 1, wherein the plurality of predefined triggers comprises one or more of:
detection of a fire; and
detection of an interruption in power to the building.

7. The building automation system of claim 1, wherein the plurality of building control components comprises one or more Air Handling Units (AHU) of a Heating, Ventilation and/or Air Conditioning (HVAC) system, and the plurality of corresponding predefined actions comprises switch off one or more of the AHUs.

8. The building automation system of claim 1, wherein the plurality of building control components comprises one or more emergency lights of a lighting system, and the plurality of corresponding predefined actions comprises switch on one or more of the emergency lights.

9. The building automation system of claim 1, wherein the plurality of building control components comprises one or more door locks of an access control system, and the plurality of corresponding predefined actions comprises unlocking one or more of the door locks.

10. The building automation system of claim 1, wherein at least two of the plurality of building control components are from two or more different building system categories including a Heating, Ventilation and/or Air Conditioning (HVAC) system, a security system, a fire system, an access control system, and a lighting system, and wherein the one or more processors cause the controller to auto-discover the at least two building control components from two or more different building system categories by communicating via the I/O interface using two or more different protocols.

11. The building automation system of claim 10, wherein the two or more different protocols are two or more building automation protocols.

12. The building automation system of claim 11, wherein the two or more building automaton protocols comprise two or more of 1-Wire, BACnet, C-Bus, CC-Link Industrial Networks, DALI, DSI, Dynet, EnOcean, KNX, LonTalk, Modbus, oBIX, VSCP, xAP, X10, DC-09, DALI, and Ethernet.

13. The building automation system of claim 10, wherein the one or more processors cause the controller to automatically categorize at least one of the building control components that are auto-discovered based, at least in part, on which of the two or more different protocols was used to auto-discover the at least one building control components.

14. The building automation system of claim 13, wherein the at least one of the building control components that are automatically categorized are sorted on the user interface by category to aid a user in finding and assigning the at least one of the building control components to a predefined action.

15. The building automation system of claim 1, wherein the one or more processors cause the controller to display building control components from two or more different building system categories on a floorplan of the building, and wherein the one or more processors further cause the controller to allow selection of a building system category and only display an operational status of the building control components of the selected building system category.

16. The building automation system of claim 1, wherein the I/O interface and controller are part of a server.

17. A non-transitory computer-readable storage medium with an executable program stored thereon, wherein the executable program instructs a building automation system having an I/O interface and a user interface to perform the following:
present via the user interface a plurality of predefined triggers;
accept via the user interface a selection of one of the plurality of predefined triggers;
for the selected one of the plurality of predefined triggers, present via the user interface a plurality of zones of the building automation system;
accept via the user interface an assignment of one or more of the plurality of zones of the building automation system to the selected one of the plurality of predefined triggers;
identify a plurality of predefined actions that correspond to the selected one of the plurality of predefined triggers;
present via the user interface the plurality of predefined actions that are identified as corresponding to the selected one of the plurality of predefined triggers;
accept via the user interface a selection of one or more of the plurality of predefined actions identified as corresponding to the selected one of the plurality of predefined triggers;
identify which of the plurality of building control components correspond to each of the one or more of the plurality of zones assigned to the selected one of the plurality of predefined triggers;
identify which of the plurality of building control components correspond to the selected one or more of the plurality of predefined actions;

for each of the selected one or more of the plurality of predefined actions for the selected one of the plurality of predefined triggers:

present via the user interface one or more of the plurality of building control components that correspond to both: (1) the corresponding one of the selected one or more of the plurality of predefined actions; and (2) the corresponding one or more of the plurality of zones assigned to the selected one of the plurality of predefined triggers;

accept an assignment of one or more of the plurality of building control components presented via the user interface; and during subsequent operation of the building automation system, detect an occurrence of the selected one of the plurality of predefined triggers, and in response, perform each of the predefined actions selected for the selected one of the plurality of predefined triggers using the one or more building control components assigned to the corresponding predefined action.

18. The non-transitory computer-readable storage medium of claim 17, wherein the plurality of building control components comprise building control components from two or more different building system categories including a Heating, Ventilation and/or Air Conditioning (HVAC) system, a security system, a fire system, an access control system, and a lighting system, and wherein for at least one of the plurality of predefined actions, an assignment is accepted of one or more of the plurality of building control components from only one of the two or more different building system categories.

19. A method for defining trigger actions in a building automation system that has a plurality of building control components from two or more different building system categories including a Heating, Ventilation and/or Air Conditioning (HVAC) system, a security system, a fire system, an access control system, and a lighting system, the method comprising:

presenting via a user interface a plurality of predefined triggers;

accepting via the user interface a selection of one of the plurality of predefined triggers;

for the selected one of the plurality of predefined triggers, presenting via the user interface a plurality of zones of the building automation system;

accepting via the user interface an assignment of one or more of the plurality of zones of the building automation system to the selected one of the plurality of predefined triggers;

identifying a plurality of predefined actions that correspond to the selected one of the plurality of predefined triggers;

presenting via the user interface the plurality of predefined actions that are identified as corresponding to the selected one of the plurality of predefined triggers;

accepting via the user interface a selection of one or more of the plurality of predefined actions identified as corresponding to the selected one of the plurality of predefined triggers;

identifying which of the plurality of building control components correspond to each of the one or more of the plurality of zones assigned to the selected one of the plurality of predefined triggers;

identifying which of the plurality of building control components correspond to the selected one or more of the plurality of predefined actions;

for each of the selected one or more of the plurality of predefined actions for the selected one of the plurality of predefined triggers:

presenting via the user interface one or more of the plurality of building control components that correspond to both: (1) the corresponding one of the selected one or more of the plurality of predefined actions; and (2) the corresponding one or more of the plurality of zones assigned to the selected one of the plurality of predefined triggers;

accepting an assignment of one or more of the plurality of building control components presented via the user interface, wherein for at least one of the selected one or more of the plurality of predefined actions, an assignment of building control components from only one of the two or more different building system categories is accepted; and during subsequent operation of the building automation system, detecting an occurrence of the selected one of the plurality of predefined triggers, and in response, performing each of the predefined actions selected for the selected one of the plurality of predefined triggers using the one or more building control components assigned to the corresponding predefined action.

\* \* \* \* \*